US008872814B1

(12) United States Patent
Agaian et al.

(10) Patent No.: US 8,872,814 B1
(45) Date of Patent: Oct. 28, 2014

(54) SYSTEM AND METHOD FOR CONVERTING MEDIA FROM A LOWER DIMENSION REPRESENTATION TO A HIGHER DIMENSION REPRESENTATION

(76) Inventors: Sos Agaian, San Antonio, TX (US); Sarkis Agaian, San Antonio, TX (US)

( * ) Notice: Subject to any disclaimer, the term of this patent is extended or adjusted under 35 U.S.C. 154(b) by 64 days.

(21) Appl. No.: 13/268,040

(22) Filed: Oct. 7, 2011

Related U.S. Application Data

(60) Provisional application No. 61/404,775, filed on Oct. 12, 2010.

(51) Int. Cl.
*G06T 15/00* (2011.01)

(52) U.S. Cl.
USPC .......................................... 345/419; 382/285

(58) Field of Classification Search
None
See application file for complete search history.

(56) References Cited

U.S. PATENT DOCUMENTS

2006/0067573 A1*  3/2006  Parr et al. ...................... 382/154

OTHER PUBLICATIONS

Dimitrov, V.S.; Jullien, G.A., "Loading the bases: a new number representation with applications," Circuits and Systems Magazine, IEEE , vol. 3, No. 2, pp. 6,23, 2003.*
Agaian, Sos S., et al. "Golden ratio-Haar wavelet based steganography." Proceedings of the 2006 International TICSP Workshop on Spectral Methods and Multirate Signal Processing, SMMSP2006, Florence, Italy. 2006.*
Stakhov, A. P. "Generalized golden sections and a new approach to the geometric definition of a number." Ukrainian Mathematical Journal 56.8 (2004): 1362-1370).*
Zhou et al. ("Two Fibonacci P-code Based Image Scrambling Algorithms", Electronic Imaging 2008. International Society for Optics and Photonics, 2008.).*

* cited by examiner

*Primary Examiner* — Tize Ma
*Assistant Examiner* — Yu Chen
(74) *Attorney, Agent, or Firm* — Craig Hoersten

(57) ABSTRACT

The system includes a module to receive data representing media content, such as a video image, a photograph, and an audio or video file, each being of a first dimension. An encoding module encoded the received data using a parametric number representation system, such a Multiple Base Number System, which includes a combination of fused numerical representation system. A decomposing module decomposes the encoded data into a plurality of signals or slices. A generating module to take the decomposed data and generates data representing the media content in a second dimension that is of a higher order that the first dimension. An output module to output a media representation of the generated higher order data. The media, by way of example could be a 3D image of a received 2D image.

7 Claims, 36 Drawing Sheets

Case P=0;

Case P=2;

Crited 3D image

Example of 3D Groove Image: Surface Profiles

Field is 1.39 x 1.07 mm; Groove width is 160 mm
Lighting is perpendicular to surface; Bright line is groove bottom.
Acquired with a digital camera and magnification.

FIG. 18

|    | 1 | 3 | 9 | 27 | 1 | 3 | 9 | 27 | 1 | 3 | 9 | 27 | 1 | 3 | 9 | 27 |
|----|---|---|---|----|---|---|---|----|---|---|---|----|---|---|---|----|
| 1  |   | ■ |   |    |   |   | ■ |    | ■ |   |   |    |   | ■ |   |    |
| 2  |   |   |   |    |   | ■ |   |    |   |   | ■ |    |   |   |   |    |
| 4  |   | ■ |   |    |   |   |   |    |   |   |   | ■  |   |   |   | ■  |
| 8  |   |   |   |    |   |   |   |    |   |   |   |    |   |   |   |    |
| 16 |   |   |   |    |   |   |   |    |   |   |   |    | ■ |   |   |    |

DBNS Representations of 15    DBNS Representations of 127

|    | 1 | 2 | 3 | 5 | 8 | 13 | 1 | 2 | 3 | 5 | 8 | 13 | 1 | 2 | 3 | 5 | 8 | 13 | 1 | 2 | 3 | 5 | 8 | 13 |
|----|---|---|---|---|---|----|---|---|---|---|---|----|---|---|---|---|---|----|---|---|---|---|---|----|
| 1  |   | ■ |   |   |   |    |   |   |   |   |   |    |   |   |   |   |   |    |   |   |   |   |   |    |
| 2  |   |   |   |   |   |    |   |   |   |   |   |    | ■ |   |   |   |   |    |   |   |   |   |   |    |
| 3  |   |   |   |   |   |    |   |   |   |   |   |    |   |   |   |   |   |    |   |   |   |   |   |    |
| 5  |   |   |   |   |   |    |   |   | ■ |   |   |    |   |   |   |   |   |    |   |   |   |   |   |    |
| 8  |   |   |   |   |   |    |   |   |   |   |   |    |   |   |   |   |   |    |   |   |   |   | ■ |    |
| 13 | ■ |   |   |   |   |    |   |   |   |   |   |    |   |   |   |   |   |    |   |   |   |   |   |    |
| 21 |   |   |   |   |   |    |   |   |   |   |   |    |   |   |   |   |   | ■  |   |   |   | ■ |   |    |

DFNS Representations of 15    DFNS Representations of 127

FIG. 19

|  | ... | Am | Am+1 | ... |
|---|---|---|---|---|
| ... | | | | |
| Bn | | ■■■ | ■■■ | |
| Bn+1 | | | | |
| ... | | | | |

Left Table: Pre-Row Reduction

|  | ... | Am | Am+1 | ... |
|---|---|---|---|---|
| ... | | | | |
| Bn | | ■■■ | | |
| Bn+1 | | | | |
| ... | | | | |

Right Table: Pre-Column Reduction

Case A)

|  | ... | Am | Am+1 | Am+2 | ... |
|---|---|---|---|---|---|
| ... | | | | | |
| Bn | | | | ■■■ | |
| Bn+1 | | | | | |
| Bn+2 | | | | | |
| ... | | | | | |

Left Table: Post-Row Reduction

|  | ... | Am | Am+1 | Am+2 | ... |
|---|---|---|---|---|---|
| ... | | | | | |
| Bn | | | | | |
| Bn+1 | | | | | |
| Bn+2 | | ■■■ | | | |
| ... | | | | | |

Right Table: Post-Column Reduction

Case B)

|  | ... | $A_m$ | $A_{m+1}$ | $A_{m+2}$ | ... |
|---|---|---|---|---|---|
| ... | | | | | |
| $B_n$ | | | | | |
| $B_{n+1}$ | | | | | |
| $B_{n+2}$ | | ■■■ | | | |
| ... | | | | | |

Left Table: Post-Row Reduction

|  | ... | $A_m$ | $A_{m+1}$ | $A_{m+2}$ | ... |
|---|---|---|---|---|---|
| ... | | | | | |
| $B_n$ | | | ■■■ | | |
| $B_{n+1}$ | | | | | |
| $B_{n+2}$ | | | | | |
| ... | | | | | |

Right Table: Post-Column Reduction 1  0

Let each pair of black followed by white bars denote the binary number 1,0.

0  1

Let each pair of white followed by black bars denote the binary number 0,1.

0  0

Let each pair of consecutive white bars denote the binary number 0,0.

STOP Symbol

Let each pair of black bars end the first Fibonacci represented symbol.

Example of Coding "78249"

0, 0,  1, 0,  1, 0,  0, 0,  0, 0,  1, 0,  1, 0,  0, 0,  1, 0,  1, 0,  0, 1,  0, 0, 0, 1

Example comparing current methods to this innovative method:

To Store 8 Digits    36 bits

Our method

Current Method

To Store 8 Digits    64 bits

| Other UPC barcodes | The binary number "1" | The binary number "0" | Fibonacci |
|---|---|---|---|
|  | <br>Each individual wide bar | <br>Each individual thin bar |  |
|  | <br>Tall dark followed by tall short bar | <br>Tall dark followed by short bar |  |

| | Mapping „1" | Mapping '0' | Mapping "-1" | Ternary representation of 78249 0,1,0,0,-1,0,1,0,0,0,0,0,0,1,0, 0,0,1,0,0,0,1,0,0,1 |
|---|---|---|---|---|
| Map | To ▍ | To ▯ | To ▍ |  |
| Map | To ▍ | To ▍ | To ▍ |  |
| Map | to wide bar | to thin bar | To ▍ |  |
| Map | Mapping „10" and „0-1" | Mapping „01" and „0 0" | Mapping "-10" and „1 1" | |
| Map | ▍ and ▍ | ▍ and ▯ | ▍ and ▍ |  |

Illustrative examples of the color UPC barcodes of the zip 78249

| Codes | Representations | | Barcodes | | | |
|---|---|---|---|---|---|---|
| | Double Base | Fibonacci | Double Base | | Fibonacci | |
| Version A | 1010001<br>100010<br>010000<br>0 | |  | | | |
| Version B | 1001100<br>1001101<br>100000<br>000000<br>000000<br>000000<br>00 | 1001101<br>0001110<br>1000000<br>0000000<br>0000000<br>00000 |  |  |  |  |
| Version C | 101001<br>0110010<br>100000<br>000000<br>000000 | |  | | | |
| Version D | 1111000<br>0000011<br>000000<br>000000<br>000000 | 1111100<br>1110010<br>0000000<br>0000000<br>0000000 |  | |  | | a) DBNS Table and Barcode b) FBNS Table and Barcode

FIG. 28

| Coordinate | Code | Coordinate | Code | Number of | Code | Coordinate | Code | Number of | Code | Coordinate | Code |
|---|---|---|---|---|---|---|---|---|---|---|---|
| 0 | 00 | 0 | 0011 | 1 | 01 | 0 | 0011 | 1 | 00 | 0 | 0000 |
| 1 | 01 | 1 | 0101 | 2 | 10 | 1 | 0101 | 2 | 01 | 1 | 0011 |
| 2 | 10 | 2 | 1001 | 3 | 11 | 2 | 1001 | 3 | 10 | 2 | 0101 |
| 3 | 11 | 3 | 0110 |   |   | 3 | 0110 | 4 | 11 | 3 | 1001 |
|   |   | 4 | 1010 |   |   | 4 | 1010 |   |   | 4 | 0110 |
| Version A |   | Version B |   | Version C |   |   |   | 5 | 1100 | 5 | 1010 |
|   |   |   |   |   |   |   |   | Version D |   | 6 | 1100 |
|   |   |   |   |   |   |   |   |   |   | 7 | 1111 |

FIG. 29

DBNS Table

|  | 1 ($3^0$) | 3 ($3^1$) | 9 ($3^2$) |
|---|---|---|---|
| 1 ($2^0$) |  |  | ■ |
| 2 ($2^1$) | ■ |  |  |
| 4 ($2^2$) | ■ |  |  |
| 8 ($2^3$) | ■ |  |  |

FBNS Table

|  | 1 ($F_0$) | 2 ($F_1$) | 3 ($F_2$) | 5 ($F_3$) | 8 ($F_4$) |
|---|---|---|---|---|---|
| 1 ($F_0$) |  |  |  |  |  |
| 2 ($F_1$) | ■ | ■ |  |  |  |
| 3 ($F_2$) |  |  | ■ |  |  |
| 5 ($F_3$) |  |  |  |  |  |
| 8 ($F_4$) | ■ |  |  |  |  |

DBNS Barcodes (Version A)

FBNS Barcodes (Version B)

DBNS Barcodes (Version C)    FBNS Barcodes (Version D)

|  | # Bits/ Coordinate | Error Detection Capability | | Error Correction Capability | |
|---|---|---|---|---|---|
| Version |  | Bits | % | Bits | % |
| A | 2 | - | - | - |  |
| B,C,D | 4 | 1 | 25 | - |  |
| E | 8 | 2 | 25 | 1 | 12.5 |
| F | 16 | 4 | 25 | 3 | 18.75 |
| ... | ... | ... | ... | ... | ... |

SYSTEM AND METHOD FOR CONVERTING MEDIA FROM A LOWER DIMENSION REPRESENTATION TO A HIGHER DIMENSION REPRESENTATION

RELATED APPLICATION

This U.S. patent application claims priority under 35 U.S.C. §119 to a provisionally filed patent application entitled "Method and System for Lower-to-Higher Dimension Modeling", having a provisional filing date of Oct. 12, 2010, and a provisional application Ser. No. 61/404,775, which is incorporated herein by reference in its entirety.

BACKGROUND OF THE INVENTION

1. Field of the Invention

This invention relates to the dimensionalization of media and in particular to system and methods for converting media or multimedia between a first lower dimensional representation and a second higher dimensional representation.

2. Background

Developing image segmentation-classification-recognition systems is challenging. Traditional cameras, microscopes, and imaging sensors are able to acquire two-dimensional (2D) images that lack the depth information. These 2D images greatly limit our ability to perceive and understand the complexity of real-world objects, as the 2D images don't have the necessary levels of detail of objects, shapes, and texture.

One example of the problem with 2D images is in the area of fingerprint-based identification. Fingerprint-based identification of an unknown victim, witness, or suspect requires that the fingerprint obtained at a crime scene match a pre-recorded fingerprint template stored in the on-board fingerprint database acquired by using different scanners. Fingerprint identification has been a great challenge due to its complex database search, which can often require the query of hundreds of millions of entries. In practice, a search of such databases involves the use of keywords such as gender and age to reduce the search space. However, the reduced database is still large and, in many cases, such keyword information is not available. Another common strategy is to divide the fingerprint database into a number of bins, based on some predefined classes such as global fingerprint patterns. Still, the state-of-the-art classifiers perform at an error rate of about 6% for these predefined classes.

In can be appreciated that that more advanced systems with small and inexpensive fingerprint capture devices, fast computing hardware, recognition rate and speed would significantly boost the crime-fighting capabilities of law. In addition, the use of multiple fingers and 3D imaging techniques could enhance recognition reliability. Fingerprint identification systems may also be extended to other applications including but not limited to computer network logon, electronic data security, e-commerce, internet access, credit card, physical access control, cellular phones, medical records, distance learning, etc. national id card, driver's license, social security, welfare disbursement, border and passport control, corpse identification, criminal investigation, terrorist identification, and parenthood determination.

Another example of an area in 2D is in barcode technology. Barcode technology continues to increase in demand with constantly improving digital technologies, such as cell phones and webcams. Traditional or 1D (one dimensional) barcodes, which represent data in monochrome parallel lines, offer a simple, inexpensive, and accurate method of encoding information. However, traditional symbologies are only capable of encoding at most a couple digits in a barcode, and in today's Information Age companies need to encode hundreds to thousands of characters to accommodate applications such as the labeling of semiconductor packages, credit cards, and software media.

Many variations of traditional barcodes have been created to provide larger amounts of information. 2D barcodes, which can be broadly classified as either stacked or matrix codes, differ from their 1D counterpart in that they are not "vertically redundant" and store essential data in both length and height. Though vertical redundancy allows a 2D symbology to store more information, it decreases the barcode's readability, especially when damaged or scanned from a distance. Since 2D code is sensitive to printing variations, it also requires additional data capacity to prevent misreads and provide a satisfactory read rate, often by encoding extra data for error correction. 3D barcodes, which are read by using differences in height, rather than contrast, to distinguish between bars and spaces using a special reader, are also used though are more expensive and not as widespread as their 1D and 2D counterparts.

Alternatives to black and white barcodes have also been proposed, namely in color barcodes. Color barcodes not only hold aesthetic value, but also store more information in the same physical size of the code. Colors have been used to represent data such as a manufacturer's code, delivery and expirations dates, and vendor identification. Examples of color symbologies include Microsoft's High Capacity Color Barcode (HCCB) and Image ID's Color Barcode System. The former, for instance, uses colored triangles instead of black and white lines or squares to increase information density. However, in increasing information content, color barcodes, like their monochrome multidimensional counterparts, have also increased complexity of recognition algorithms as they require greater image segmentation. As a result, color barcodes are not prevalent and are primarily limited to identifying commercial audiovisual works such as motion pictures, video games, broadcasts, digital video recordings and other media.

The primary criterion for judging the aforementioned barcodes is their performance. Barcode performance is usually evaluated by three basic criteria: reliability, density, first time read rate. To improve performance, barcodes often contain error detection and correction check-digits, which help ensure accurate readings. Checking operations, however, can be very expensive in computer time and may increase barcode overhead costs. In addition, there are two more criteria at issue, i.e. security and cost. Barcode security is defined as either a protection of barcodes against unauthorized access or a technique for ensuring that barcoded information cannot be read or compromised by any individuals without authorization. Barcodes are often not traceable to a specific source of production and therefore do not necessarily provide a means of authentication that the product identified has been legitimately produced.

Error correction for barcodes has primarily come in the form of single level error correction. The use of current technologies for error detecting and correcting are often insufficient or complex, requiring additional extensive hardware and reducing other performance criteria such as speed and information handling capability. Resolving the problems with current error correction capabilities may require new barcodes more resistant to damage and with perhaps double the error correction capabilities. Although many barcode readers can read multiple barcode symbologies, there is no symbology that can be read by different kinds of readers at different data density levels.

Attempts to prevent barcodes from being reproduced have also been made. Text printed near barcodes in ink only visible under ultraviolet light and microscopic size particles (taggents) that electromagnetic energy in a unique and quantifiable manner when read are examples of attempts to provide barcode authentication. However, these devices can be copied and tend to add expense to a product.

The problems illustrated in the above fingerprinting and barcoding examples can also be extended to many other fields, including but not limited to: film, currency, medicine, bio-technology, insurance, biochemistry, botany, brain mapping, cell biology, DNA, dentistry, orthopedics, developmental biology, forensics, fluid inclusions, energy, textile industry, food technology, wide range of materials, consumer, security, military, defense, computer vision, fracture analysis, geology and micro fossils, immunolabeling, inspection, in situ hybridization, marine biology, morphology, micromanipulation, neuroscience, pathology, paleontology, parisitology, physiology, plant biology, quality control, research, semiconductor, tissue engineering, photography, education, electronic games and others.

Existing 2D-to-3D conversion technologies can be classified into following 2 basic classes: stereo conversion methods and reconstruction algorithms based on sequences/slices of images. However, these methods of 2D-to-3D conversion are not yet sufficient for the more demanding applications in biology, cosmetics, fabric and food industry, medicine, materials, military, defense, electronic games and others. The restrictions of 2D signals greatly limit our ability to perceive and to understand the complexity of real-world objects and raise issues of how to create a cost efficient, automatic, higher dimension model from a single lower one.

BRIEF DESCRIPTION OF THE SEVERAL VIEWS OF THE DRAWINGS

FIG. 7b illustrates an example of image decomposition in accordance with the present invention;

FIG. 18 illustrates the 2D double base and double Fibonacci representations of numbers 15 and 127;

FIG. 19 illustrates the block diagram of reduction algorithms when $A_m$ and $B_n$ are expressed recursively (i.e. as in the case of Lucas and Fibonacci numbers and their variants) or as multiples of the Golden Ratio;

FIG. 28 illustrate the application of flow diagram illustrated in FIG. 25 applied to coding data "78249";

FIG. 29 illustrates the DBNS and FBNS representations of the digits 7, 8, 2, 4, and 9;

DETAILED DESCRIPTION OF THE INVENTION

The present invention will be described with reference to data representation, coding, decomposition systems, automatic conversion of lower n-Dimensional to higher m-Dimensional media conversion system, without the use the depth estimation, and without the requirement of prior knowledge about the data content. The present invention may be utilized in various applications, including but not limited to, fingerprint identification and scanning, cancer imaging, thermal imaging, skin animally recognition, fabric and food imaging, and barcoding systems.

These features are just illustrative and should not be taken in a limiting sense. These and other features, aspects, and advantages of the present invention will become better understood with regard to the following description, appended claims, and accompanying drawings. The present invention is not intended to be limited to the use of any particular barcode, or multimedia processing system. Various modifications may be made without departing from the spirit and scope of the described embodiments.

Figure 1:
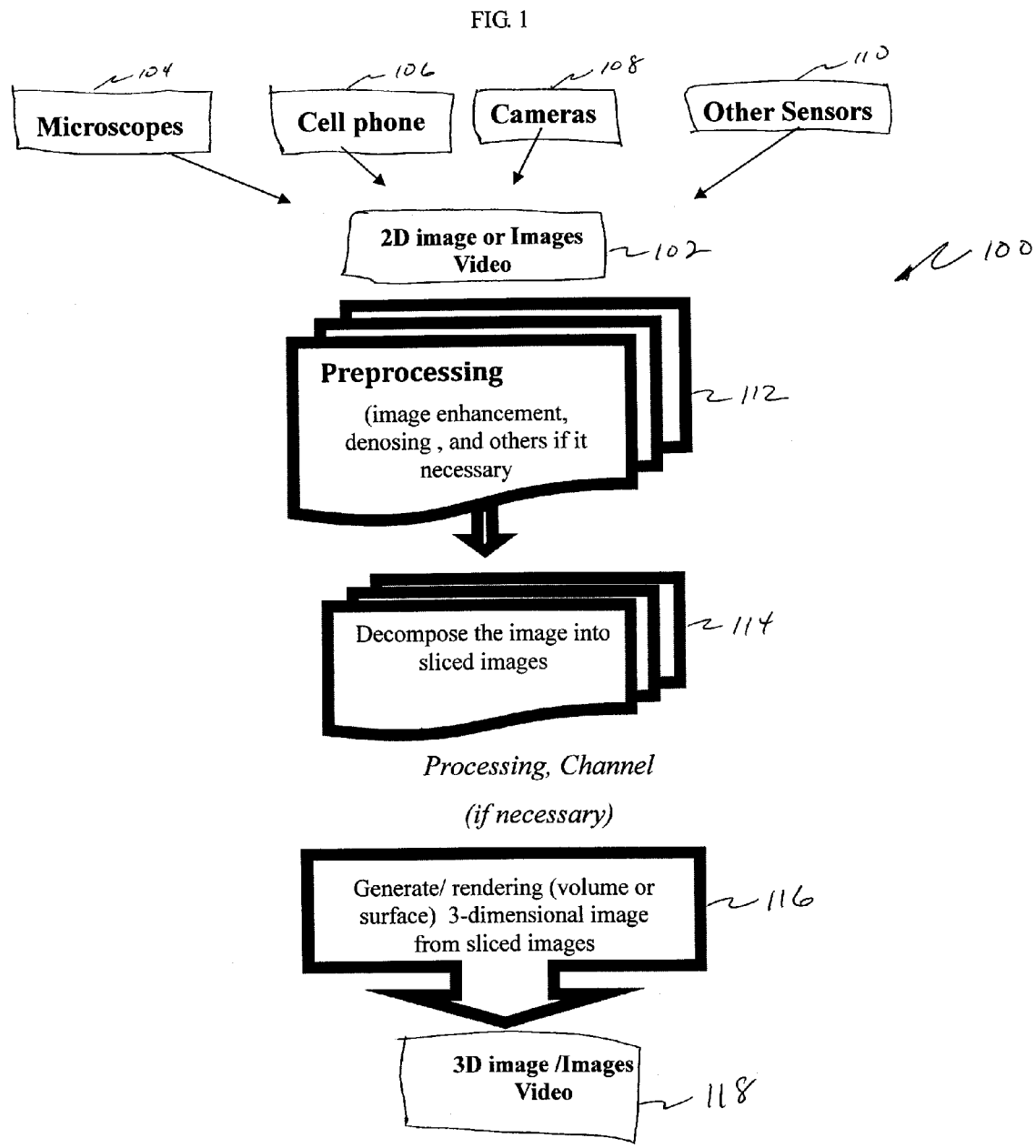
FIG. 1 is a flow diagram illustrating a configuration of dimensionalization of media content according to an embodiment of the present invention.

FIG. 1 illustrates a schematic block diagram of an embodiment of a system 100 for converting 2-dimensional (2D) multimedia content, such as but not limited to still images or video images, into 3-dimensional (3D) multimedia content, such as, but not limited to, still images or video images. 2D images/videos 102, which can be acquired from various input sources, such as microscopes 104, cell phones, 106, cameras 108 or other sensors 110, such as a scanner, is obtained and preprocessed, if necessary at step 112. Preprocessing, by way of example, can include image enhancement, noise reduction or virtually any type of image enhancement. Next, the image or video is decomposed into sliced images (step 114). Then at step 116, the generation or rendering (volume or surface) of the 3D image from the sliced images is performed. Then, an output of the generated 3D image is created, such as a print or a video image (step 118). As can be appreciated system 100 utilizes computer(s) and associated components for processing the image and display or printer components for outputting the generated 3D image/video.

Figure 2:
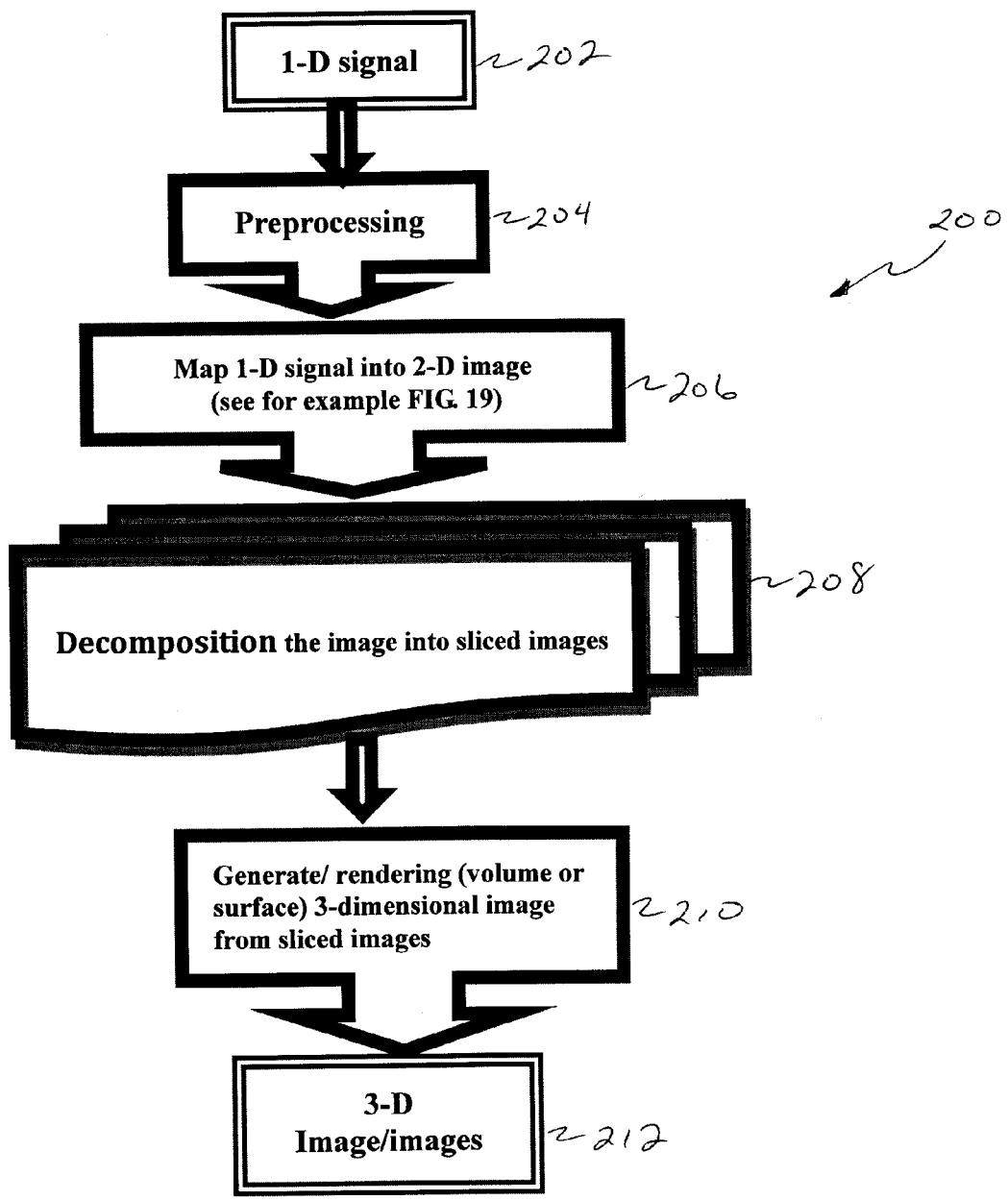
FIG. 2 is a flow diagram illustrating an exemplary embodiment of the conversion of a 1-D signal to 3D image.

FIG. 2 illustrates a schematic block diagram of an embodiment of a system 200 for converting 1-dimensional (1D) signal, such as but not limited to an audio signal, DNA or text, into 2D image then to a 3D image. The 1D signal is received at input 202 and preprocessed (step 204), if necessary. Preprocessing, by way of example, can include mapping the text or symbols into numerical sequences, noise reduction or virtually any type of enhancement. Next, the 1D signal is mapped or represented (step 206) as a 2D image utilizing a Multiple Base Number System (MBNS), which is described in greater detail herein below with reference to FIGS. 6 and 19. Then the 2D signal is decomposed into sliced images (step 208). Then at step 210, the generation or rendering (volume or surface) of the 3D image from the sliced images is performed. Then, an output of the generated 3D image is created, such as a print or a video image (step 212). As can be appreciated system 200 utilizes computer(s) and associated components for processing the image and display or printer components for outputting the generated 3D image/video.

Figure 3:
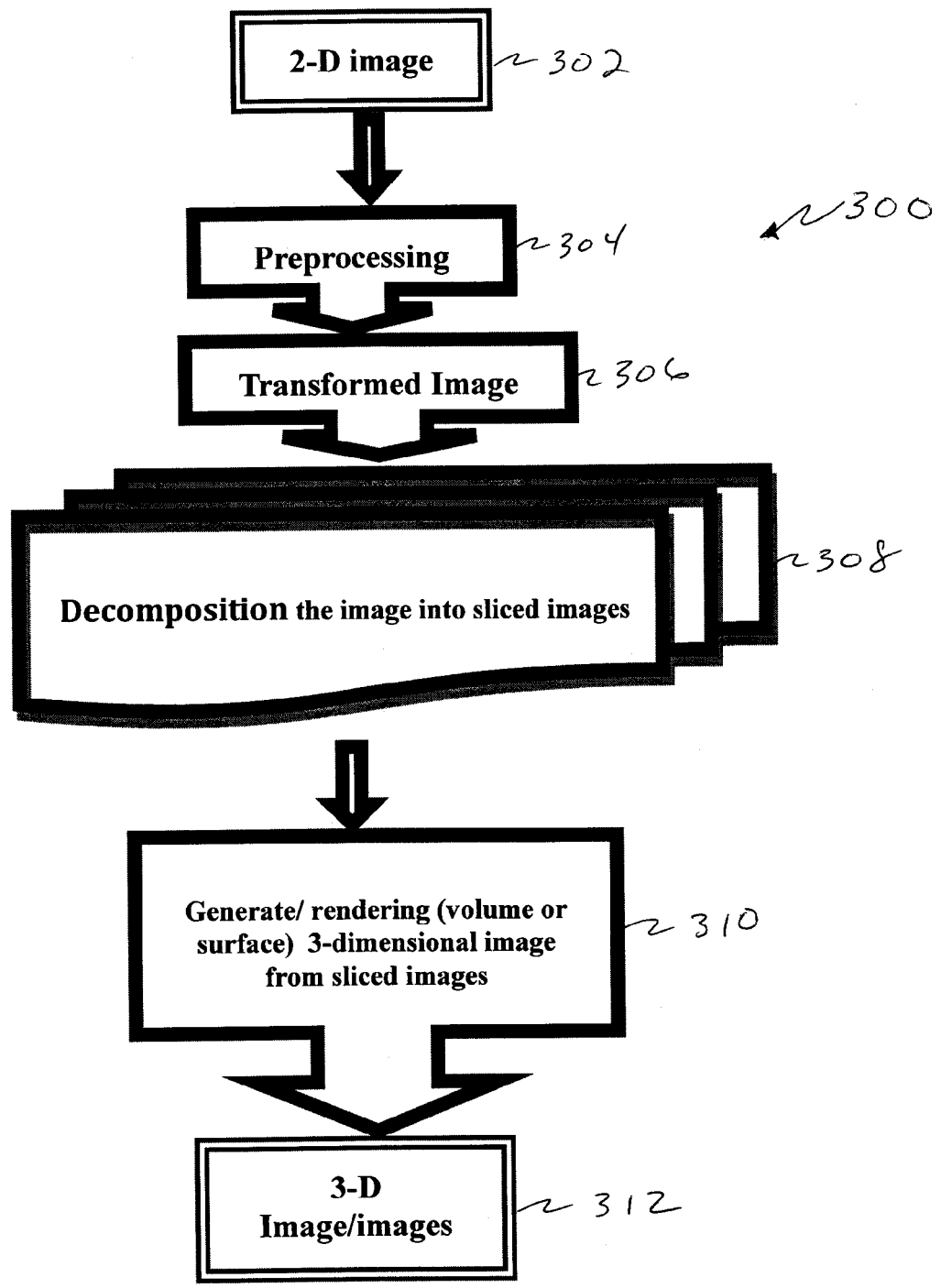
FIG. 3 is a flow diagram illustrating an exemplary embodiment of the conversion of a 1-D signal to a 3D image in transform domain.

FIG. 3 illustrates a schematic block diagram of an embodiment of a system 300 for converting 2D multimedia content, such as but not limited to still images or video images, into 3D multimedia content, such as, but not limited to, still images or video images. 2D images/videos 302, which can be acquired from various input sources, such as microscopes, cell phones, cameras or other sensors, such as a scanner, is obtained and preprocessed and transformed, if necessary at steps 304 and 306. Preprocessing, by way of example, can include image enhancement, noise reduction or virtually any type of image enhancement. Next, the image or video is decomposed into sliced images (step 308). Then at step 310, the generation or rendering (volume or surface) of the 3D image from the sliced images is performed. Then, an output of the generated 3D image is created, such as a print or a video image (step 312). As can be appreciated system 300 utilizes computer(s) and associated components for processing the image and display or printer components for outputting the generated 3D image/video.

Figure 4:
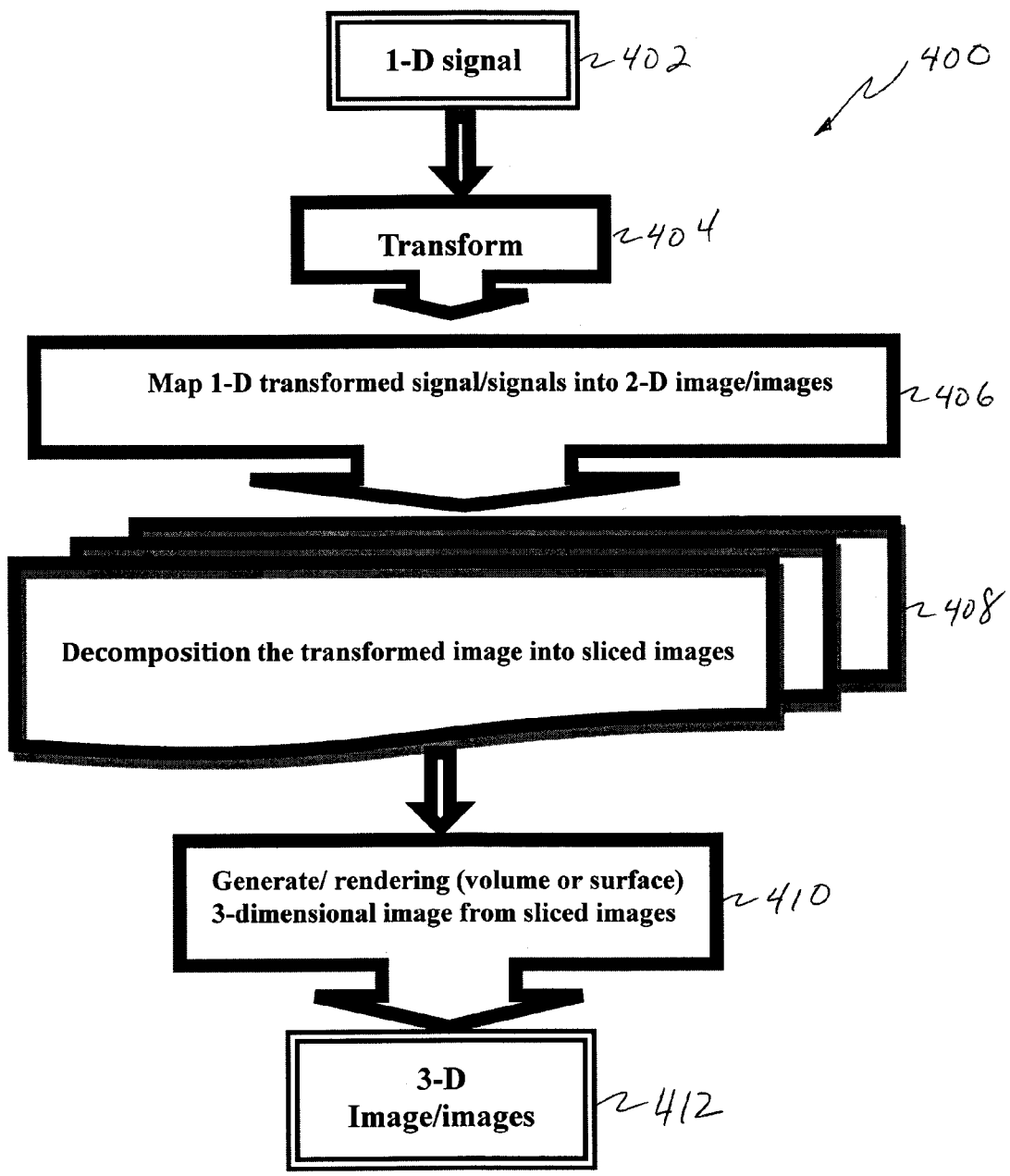
FIG. 4 is a flow diagram illustrating an alternative exemplary embodiment of the conversion of a 1-D signal to a 3D image in transform domain.

FIG. 4 illustrates a schematic block diagram of an embodiment of a system 400 for converting 1D signal, such as but not limited to an audio signal, DNA or text, into 2D image then to a 3D image. The 1D signal is received at input 402 and transformed/preprocessed (step 404), if necessary. Transforming/preprocessing, by way of example, can include mapping the text or symbols into numerical sequences, noise reduction or virtually any type of enhancement. Next, the transformed 1D signal is mapped or represented (step 406) as a 2D image utilizing MBNS, which is described in greater detail herein below with reference to FIGS. 6 and 19. Then the transformed 2D signal is decomposed into sliced images (step 408). Then at step 410, the generation or rendering (volume or surface) of the 3D image from the sliced images is performed. Then, an output of the generated 3D image is created, such as a print or a video image (step 412). As can be appreciated system 400 utilizes computer(s) and associated components for processing the image and display or printer components for outputting the generated 3D image/video.

Figure 5:
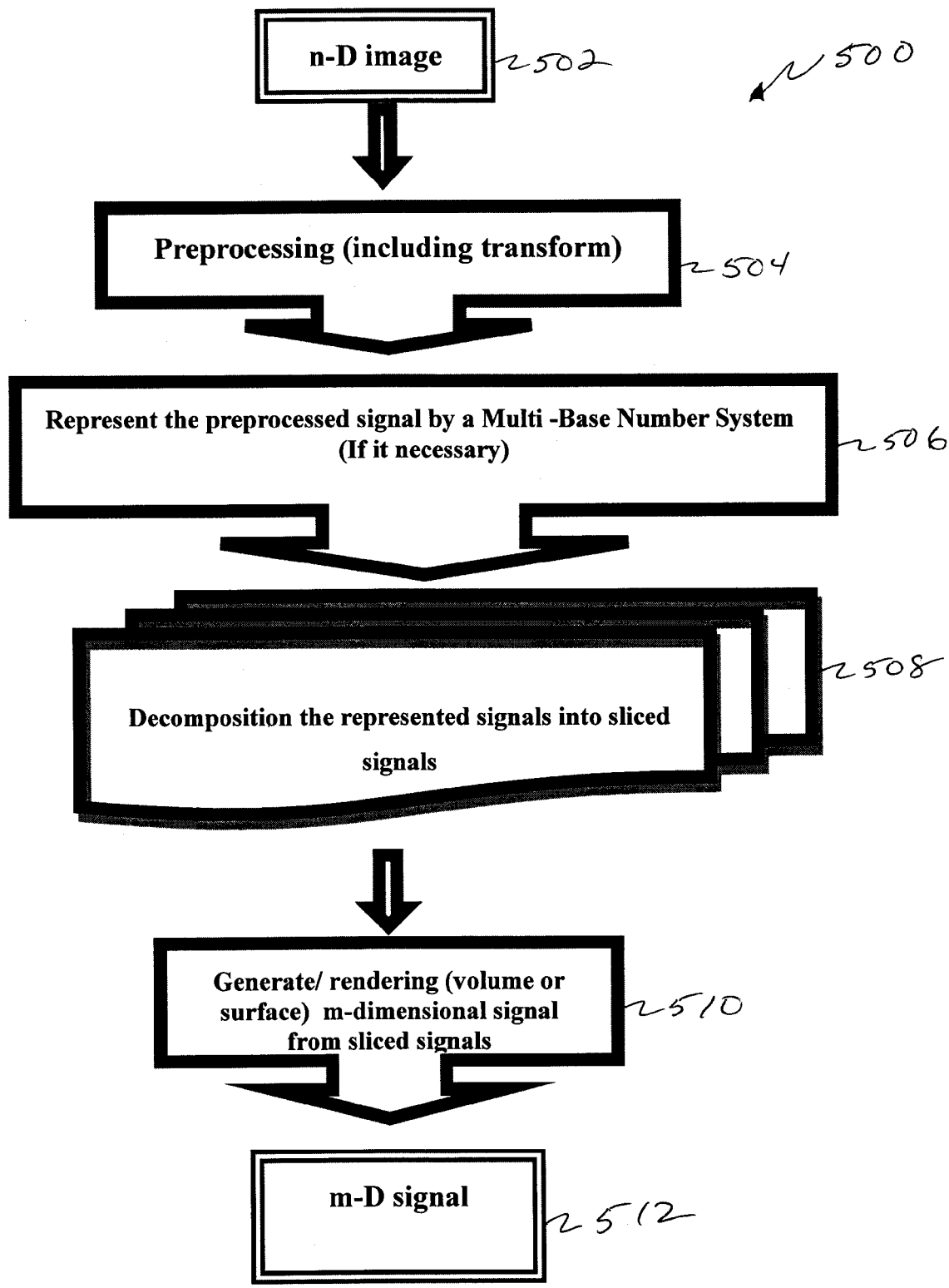
FIG. 5 is a flow diagram illustrating an exemplary embodiment of the conversion of an n-dimensional image to a higher m-dimensional image.

FIG. 5 illustrates a schematic block diagram of an embodiment of a system 500 for converting n-dimensional (n-D) signal or image to a higher m-dimensional (m-D) image. The n-D signal is received at input 502 and preprocessed and transformed (step 504). Transforming/preprocessing, by way of example, can include mapping the text or symbols into numerical sequences, noise reduction or virtually any type of enhancement. Next, the preprocessed transformed n-D signal is mapped or represented (step 506) as an MBNS signal, which is described in greater detail herein below with reference to FIGS. 6 and 19. Then the MBNS signal is decomposed into sliced images (step 508). Then at step 510, the generation or rendering (volume or surface) of the m-D image from the sliced images is performed. Then, an output of the generated m-D image is created, such as a print or a video image (step 512). As can be appreciated system 500 utilizes computer(s) and associated components for processing the image and display or printer components for outputting the generated 3D image/video.

It is contemplated to be within the scope of the present invention that that the above method can be use for converting a n-D data to m-D (n=2, 3, 4, 5, . . . m=1, 2, 3, 4, 5, . . . ), data, including, 1-D signal into 3-D signal, for converting a 2-D image into 3-D image or 4-D image; for converting a 2-D video into 3-D video or 4-D video;

In reference to the systems disclosed in FIGS. 1-5 above, it is contemplated that the decomposition of the signal/image can be done by using following methods:

Weighted Fibonacci and Lucas (F-L) p-Numbers based decompositions

Random n-dimensional (p,n) Fibonacci sequences based decompositions k-Generalized Fibonacci Numbers based decompositions n-dimensional Meta-Golden ratio based decompositions Generalized Phi Number System based decompositions Prime Number System based decompositions Commonly used Empirical Mode Decomposition (EMD) or new generalized Empirical Mode Decomposition (GEMD)

Figure 7A:
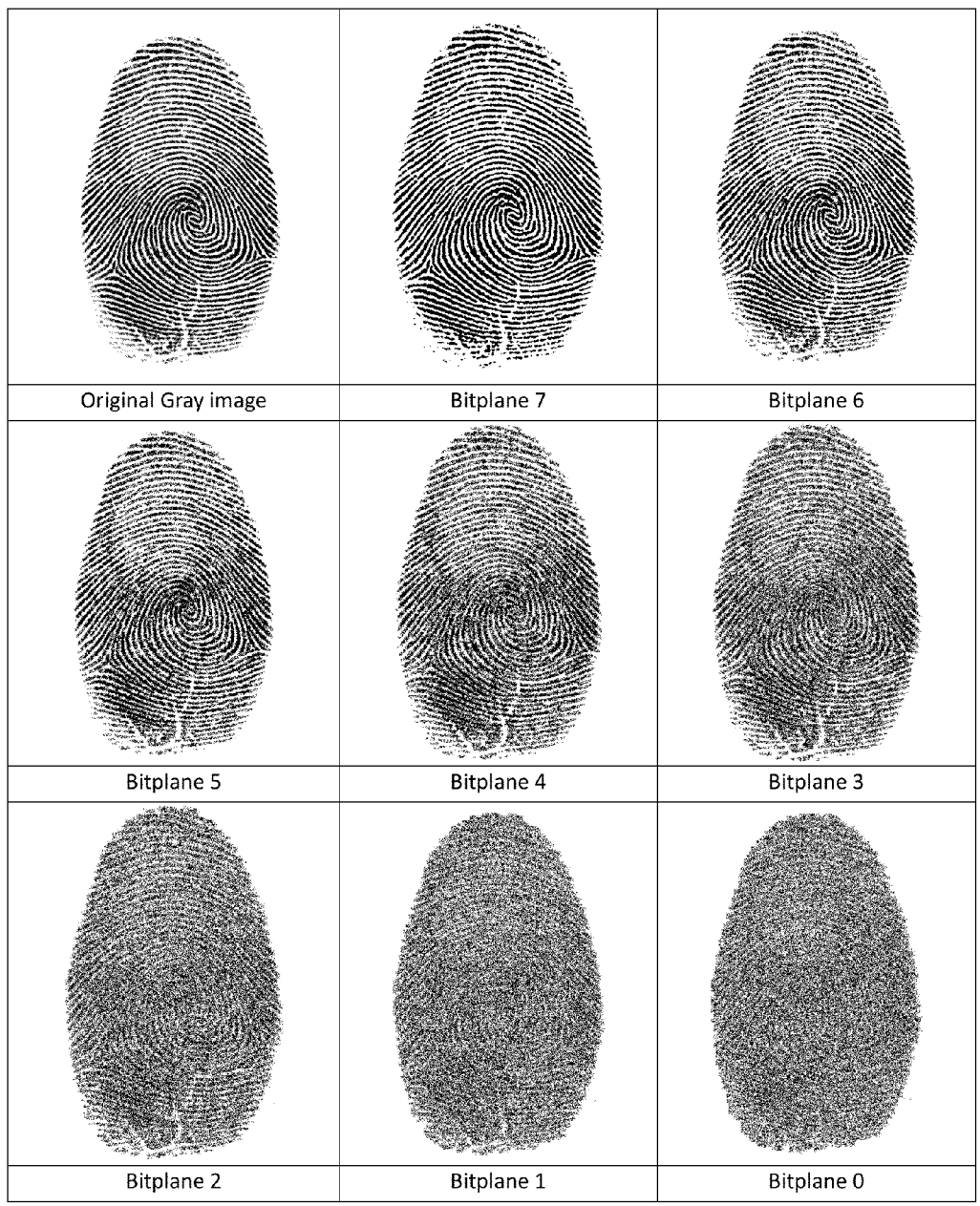
FIGS. 7a-7c illustrate examples of a fingerprint decomposition using Fibonacci p-code.
Figure 7B:
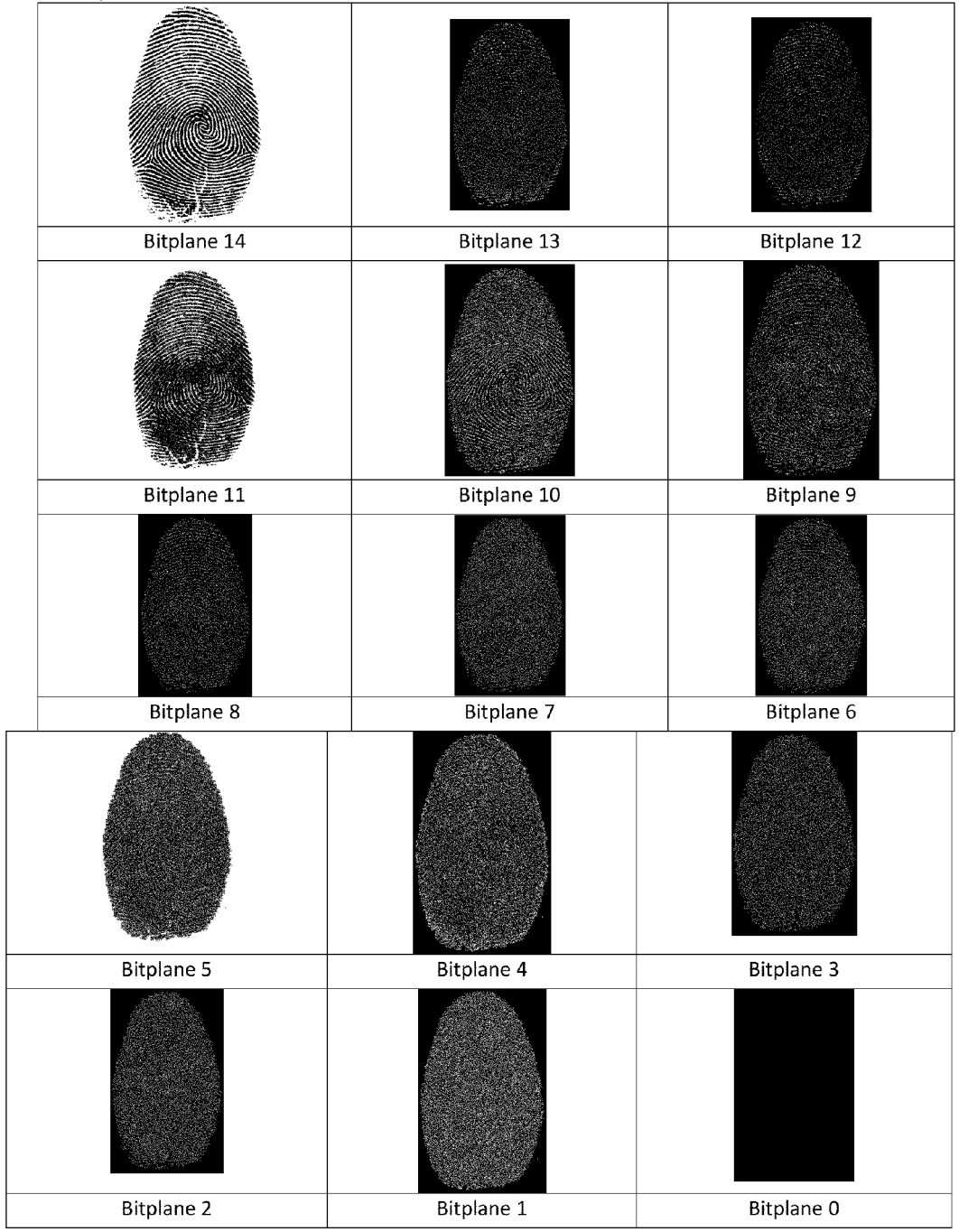
Figure 7C:
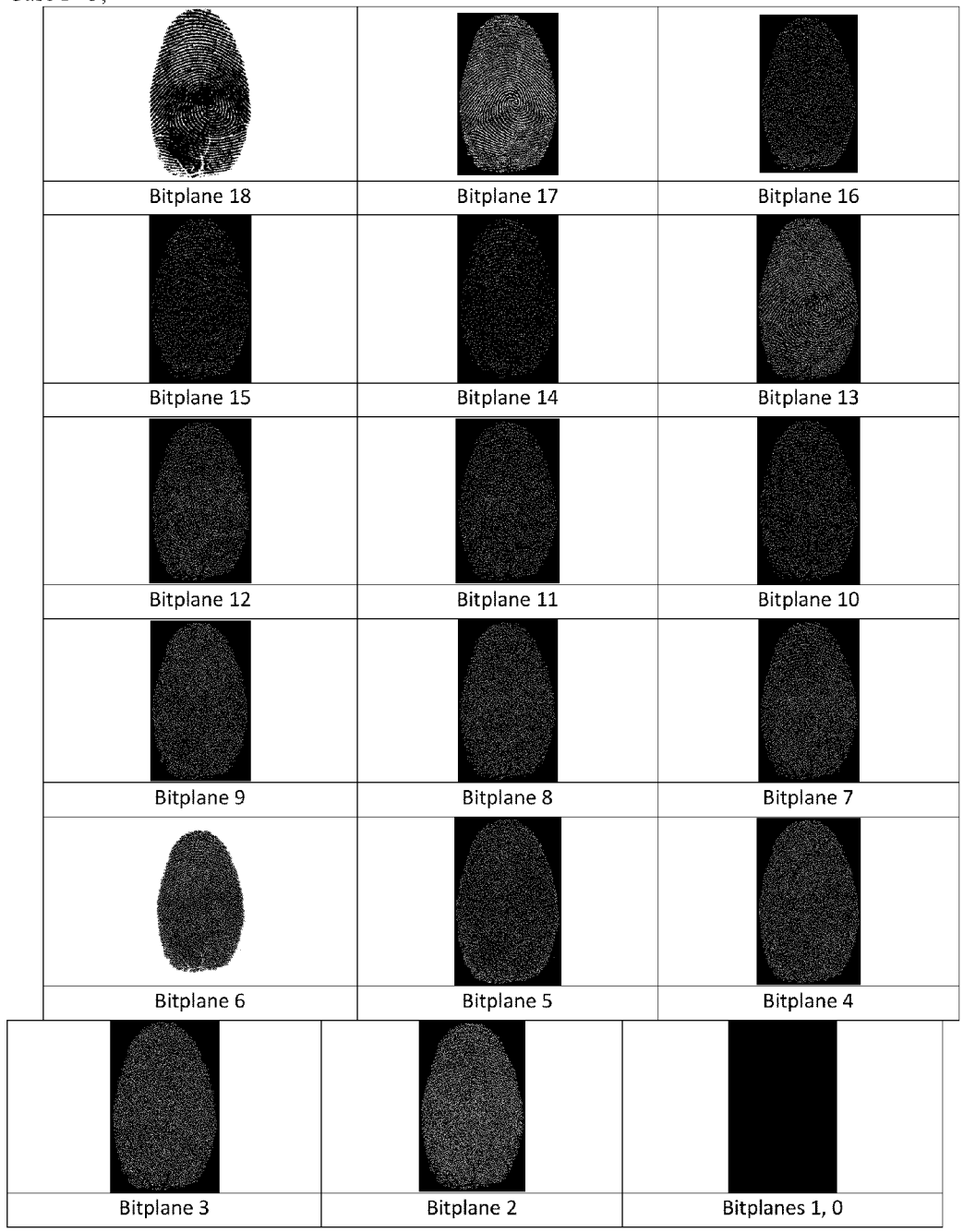
Figure 8A:
FIG. 8 illustrates an example of an image decomposition of a grayscale image using the ternary numeral system (base-3) with numerals $\{0, 1, 2\}$.
Figure 8B:
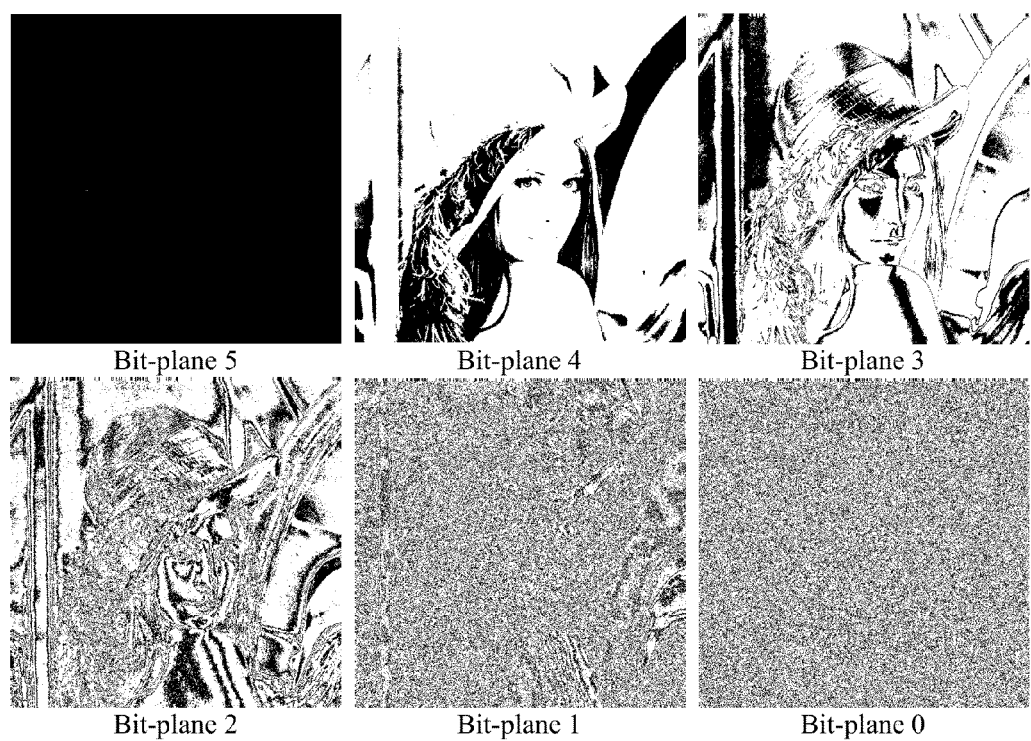
Figure 9:
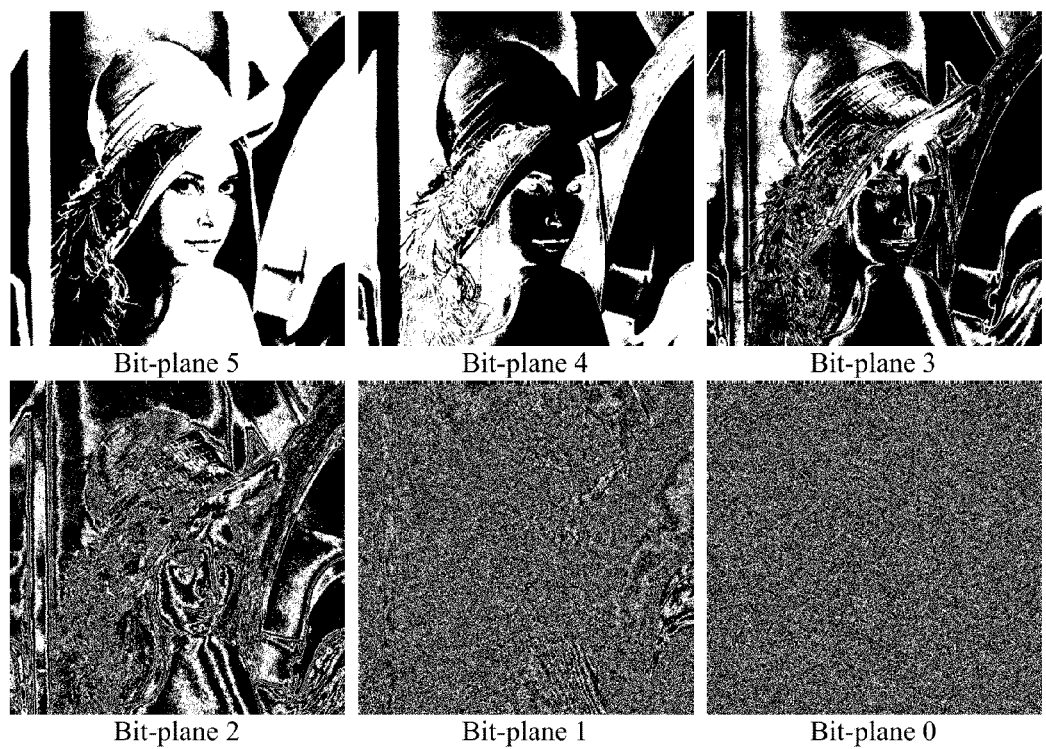
FIG. 9 illustrates another example of an image decomposition of a grayscale image using the ternary numeral system (base-3) with numbers $\{0, 1, 2\}$.

Any representation systems including Wavelet, Fourier, cosine, sine, Hartley, trigonometric, Haar, Hadamard Threshold decomposition Polynomial binarization Other existing or newly developed decomposition methods In reference to the systems disclosed in FIGS. 1-5 above, the generation of a 3D representation from the set of 2D images can be done by using the following key approaches known as the surface rendering (shows the interested surface information of objects) and volume rendering (shows both inner and outer information of objects). In terms of the reconstruction speed and memory surface rendering approach has advantages for 3-dimensional image reconstruction applications over volume rendering. The surface rendering procedure is much faster than volume rendering with regard to the interactivity, reconstruction speed, and memory In reference to the systems disclosed in FIGS. 1-5 above, the reconstruction techniques for three dimensional visual representations of two dimensional image slices include techniques such as MRI and CT stacks and can be implemented with newly developed and commercial software like MATLAB, Amira, 3D-Doctor, and Software ImageJ. Other reconstruction methods include:

fiducially marker-based methods, feature-based methods using contours, crest lines or characteristic points extracted from the images gray level-based registration techniques for the whole image Referring to FIGS. 7a-7c, there are illustrated examples of a fingerprint decomposition using Fibonacci p-code. FIG. 8a illustrates an example of image decomposition and FIG. 8b illustrates examples of an image decomposition of a grayscale image using the ternary numeral system (base-3) with numerals {0, 1, 2}. FIG. 9 illustrates another example of an image decomposition of a grayscale image using the ternary numeral system (base-3) with numbers {0, 1, 2}.

Figure 10A:
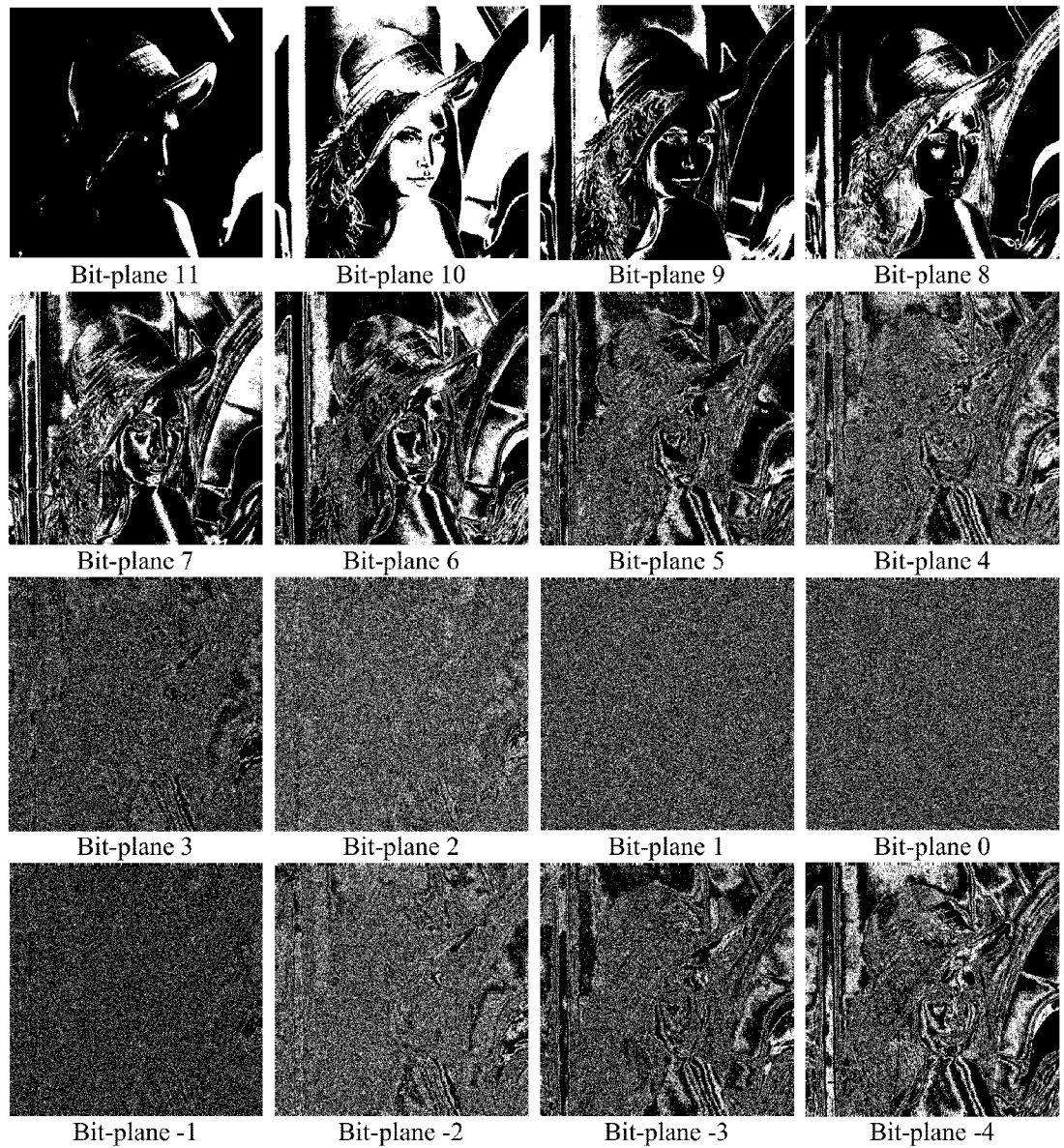
FIG. 10 illustrates an example of an image decomposition of a grayscale image using the ternary numeral system (base-3) with numbers $\{-1, 0, 1\}$.
Figure 10B:
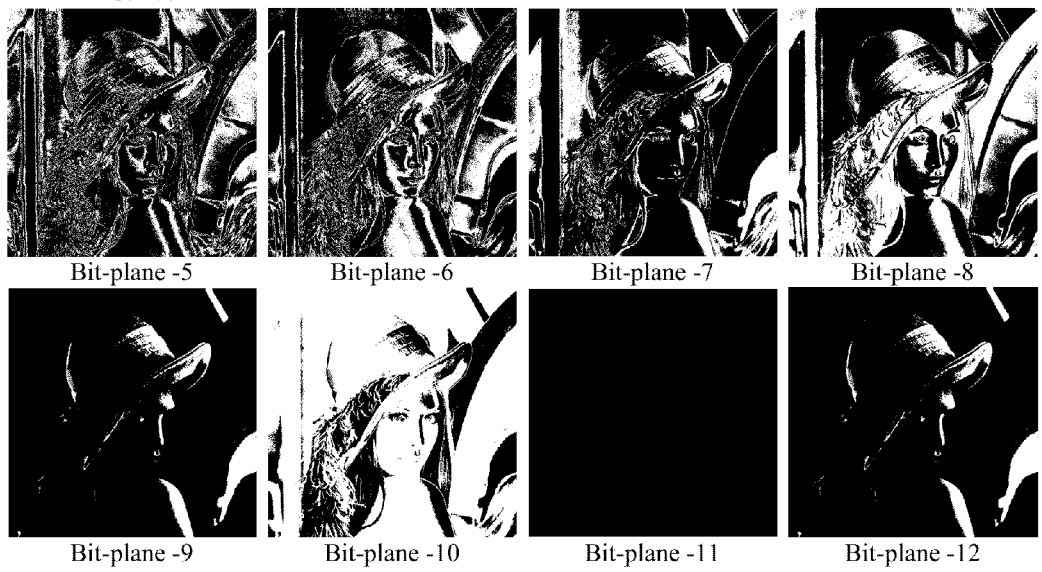
Figure 11:
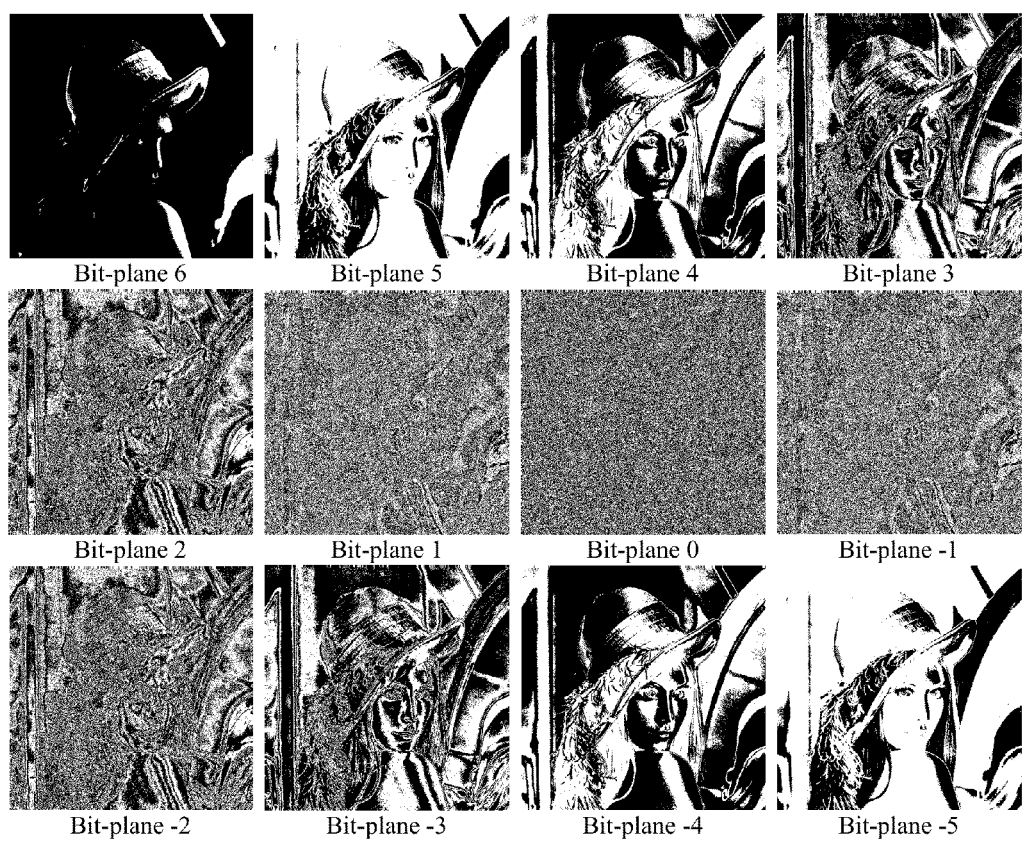
FIG. 11 illustrates an example of an image decomposition of a grayscale image using the Phi number system (base-$\phi$) with numerals $\{0, 1\}$.
Figure 12A:
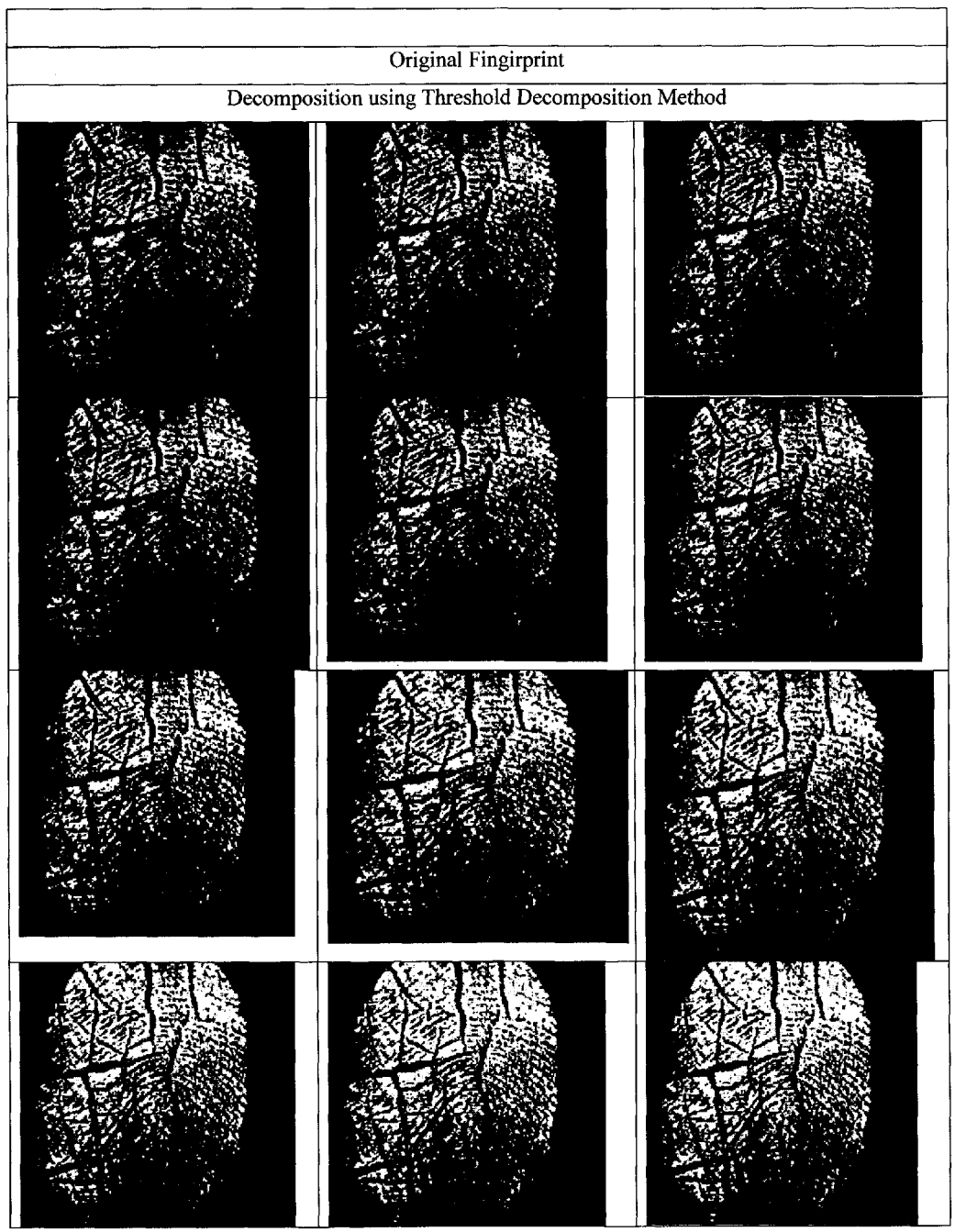
FIG. 12 illustrates an example of an image decomposition of a grayscale fingerprint image using a threshold decomposition method.
Figure 12B:
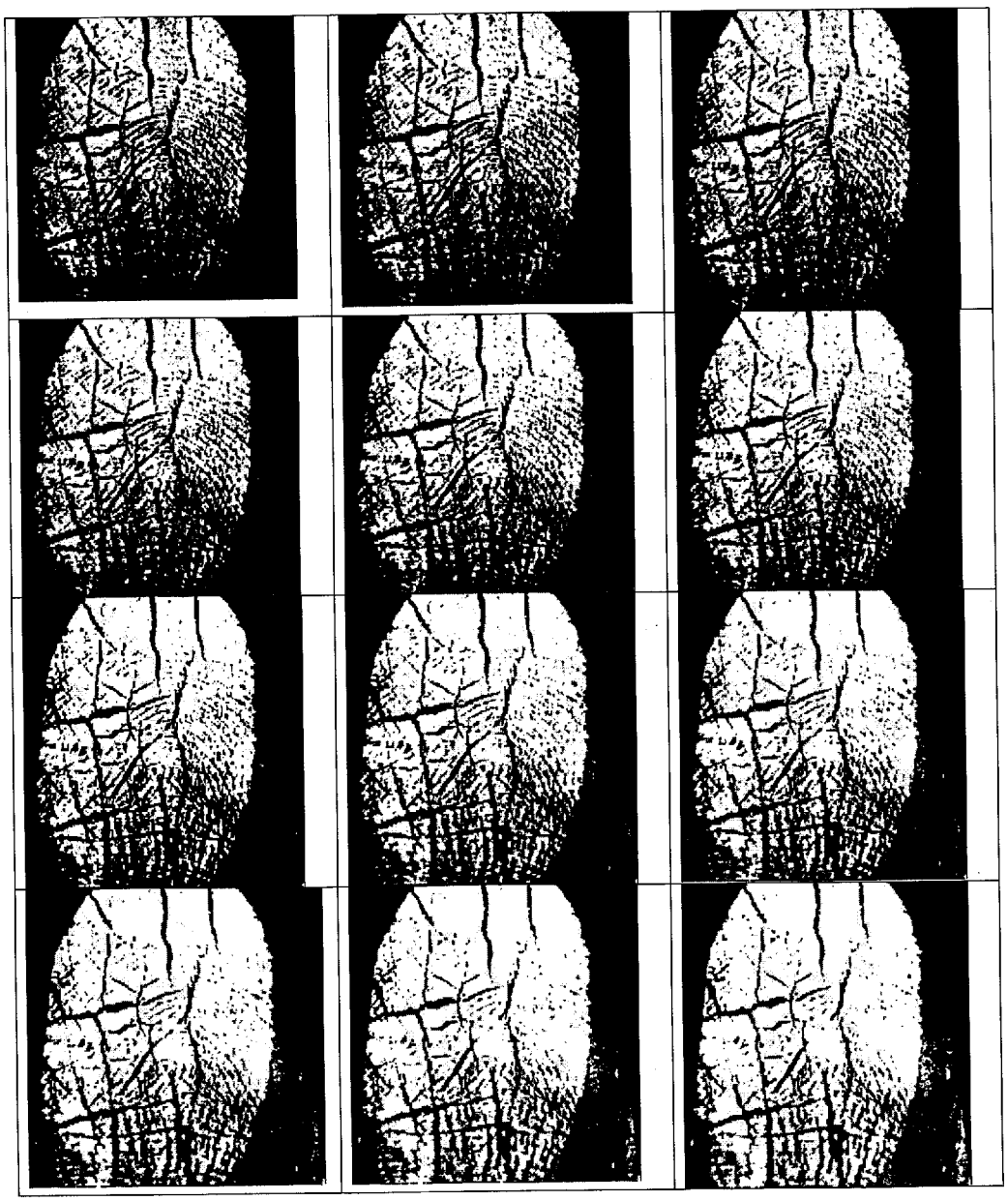
Figure 12C:
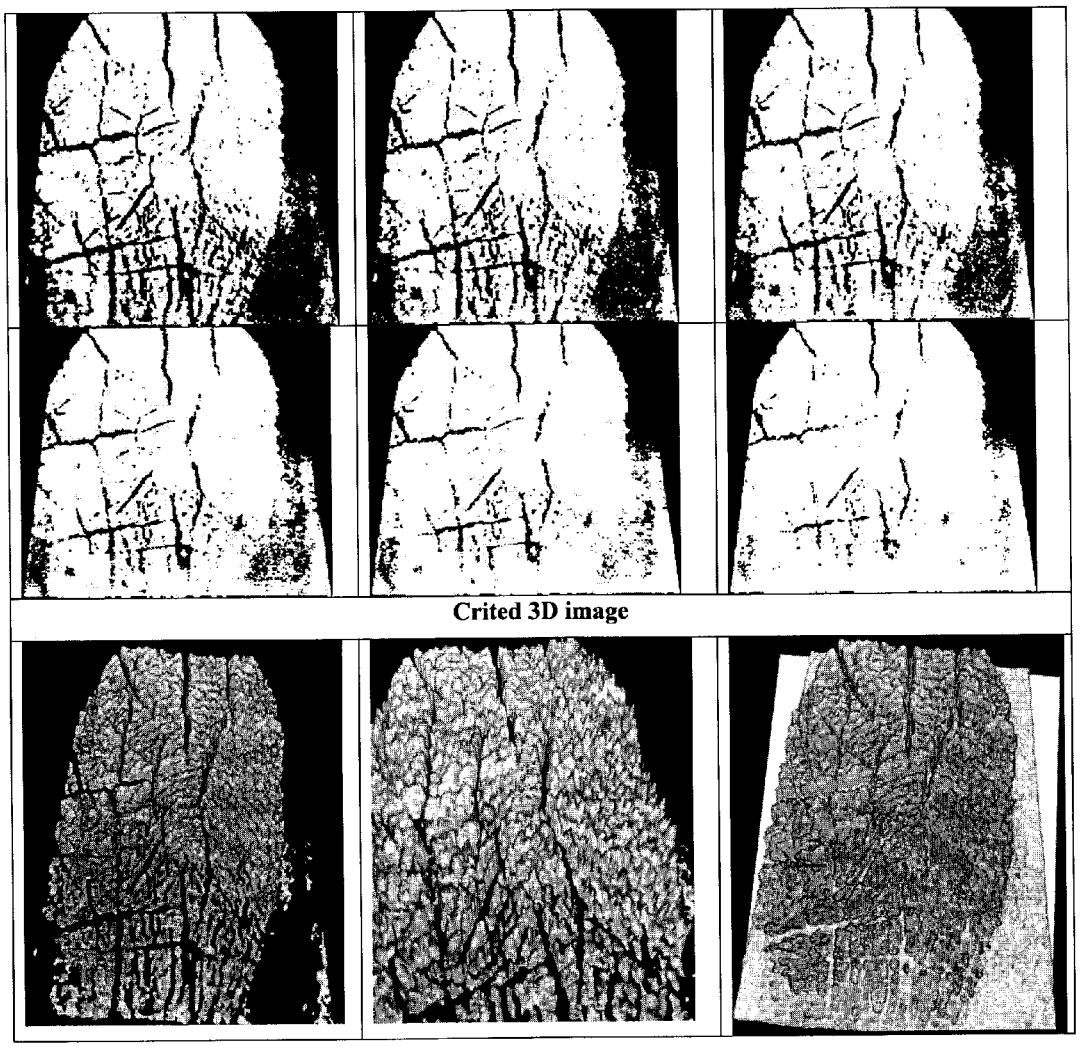
Figure 13:
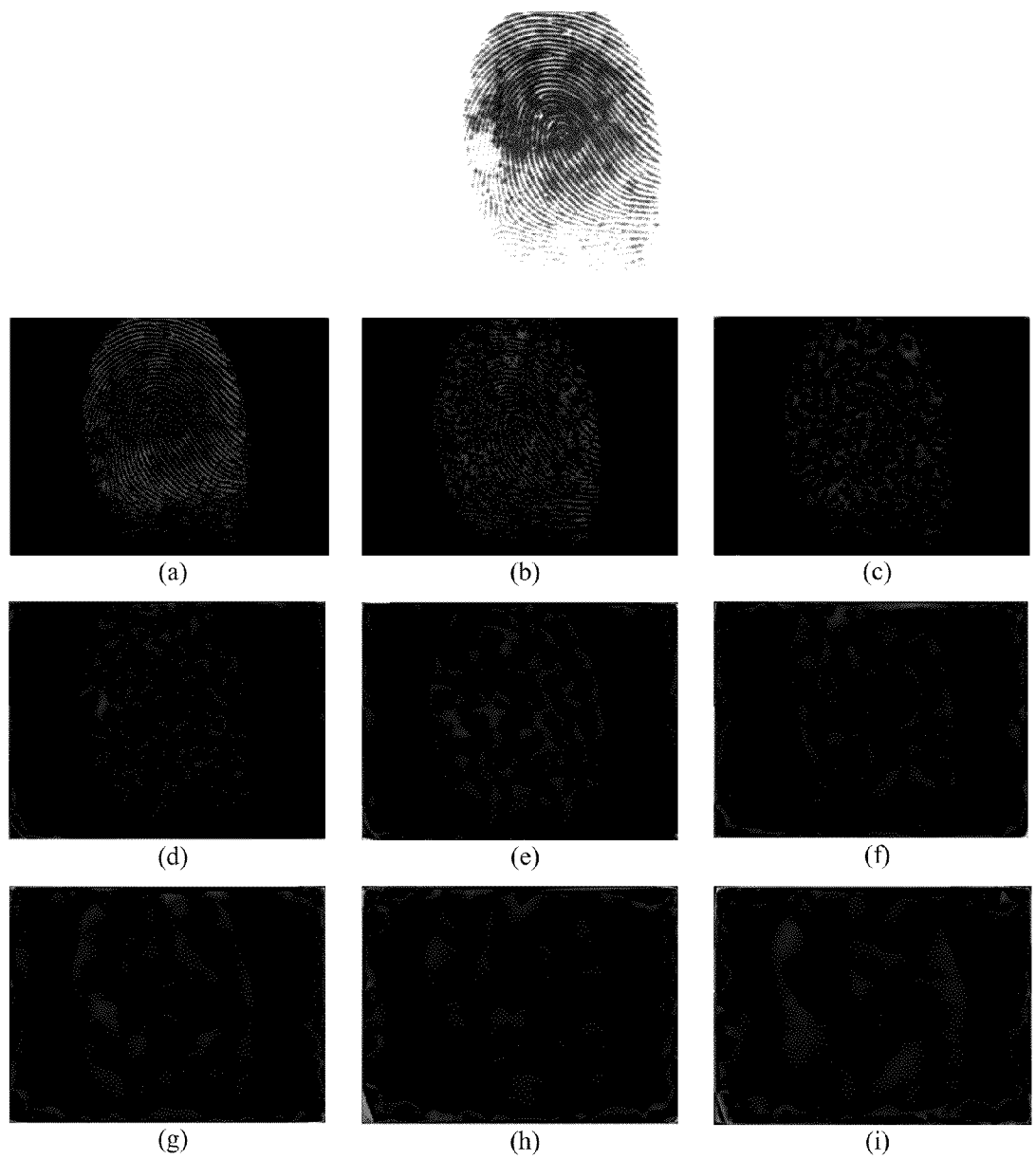
FIG. 13 illustrates an example of an image decomposition of a grayscale fingerprint image using EMD.
Figure 13B:
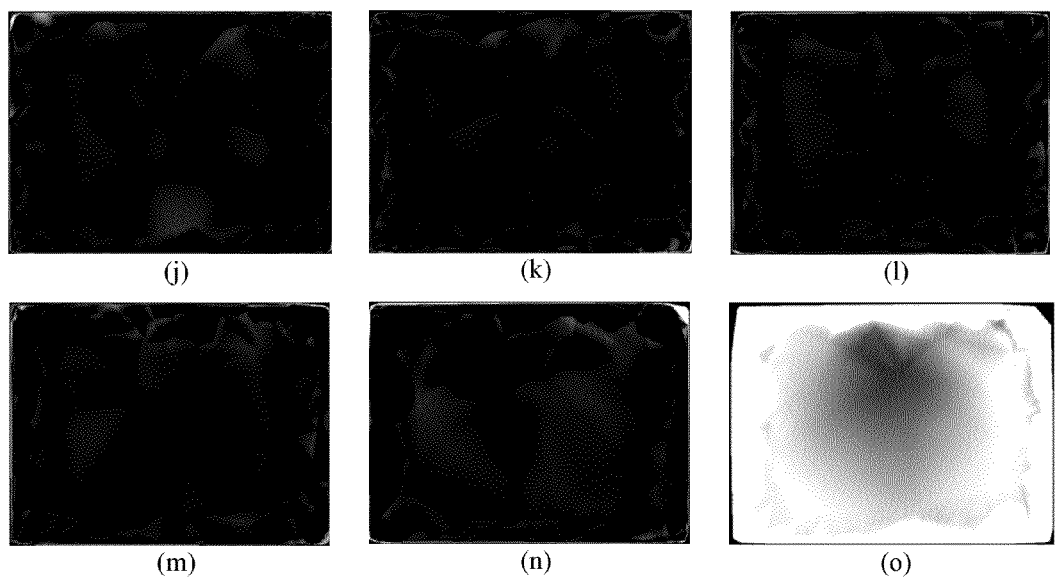
Figure 14:
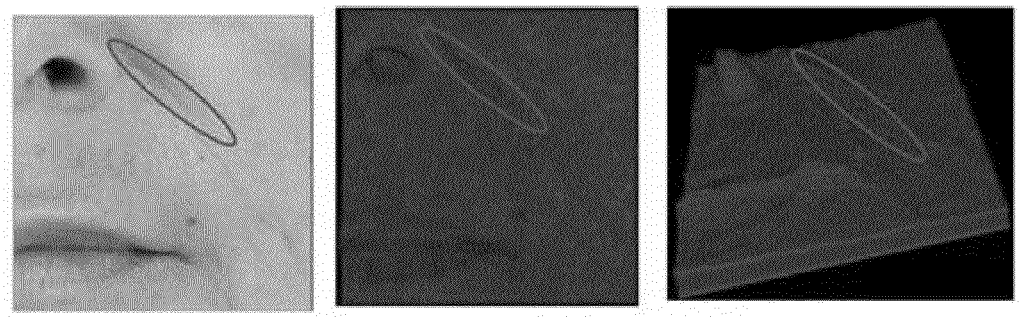
FIG. 14 illustrates an example of the dimensionalization of a 2D image according to an exemplary embodiment of the present invention.
Figure 15:
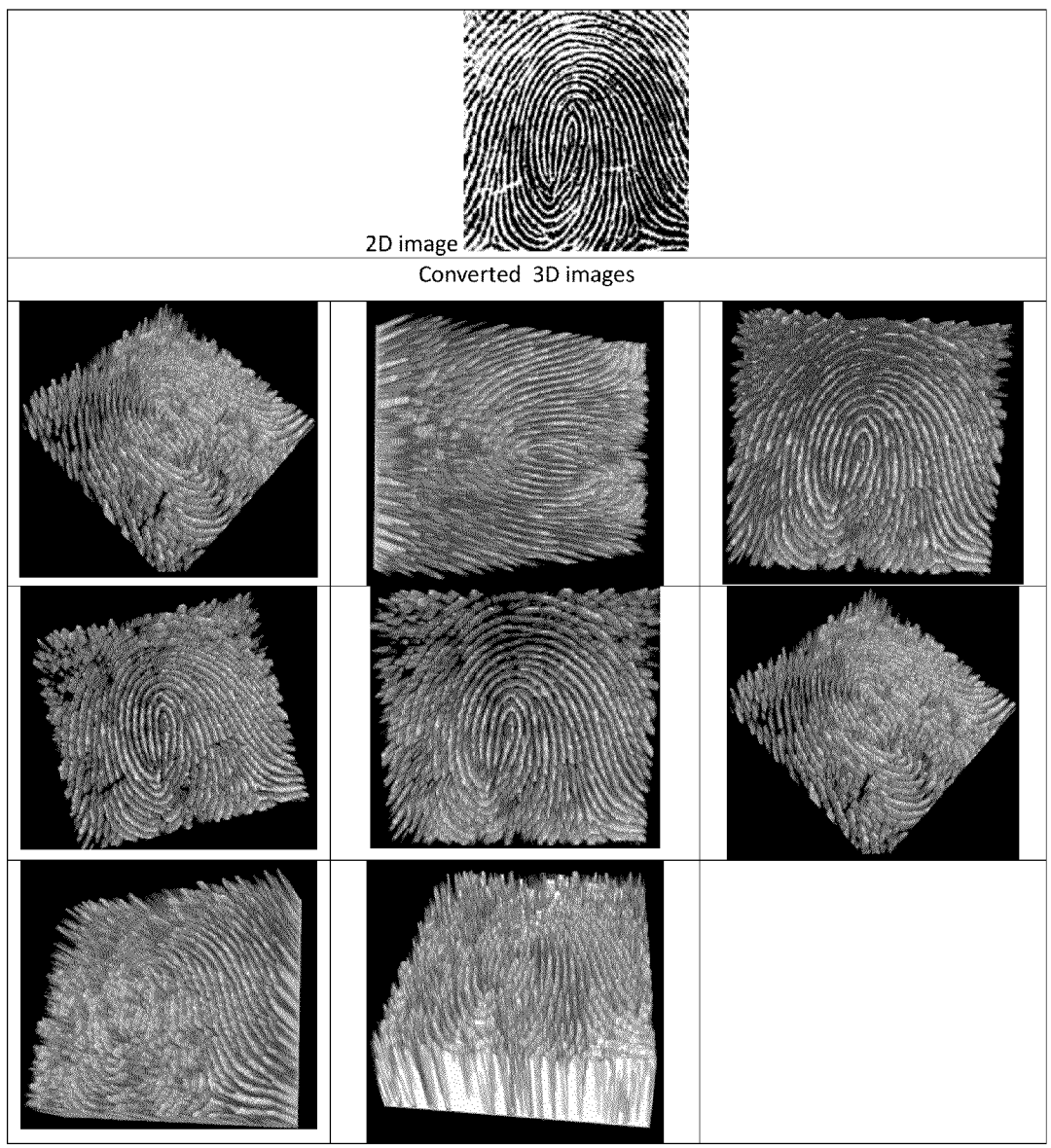
FIG. 15 illustrates an example of a 2D grayscale fingerprint image converted to a 3D image.
Figure 16:
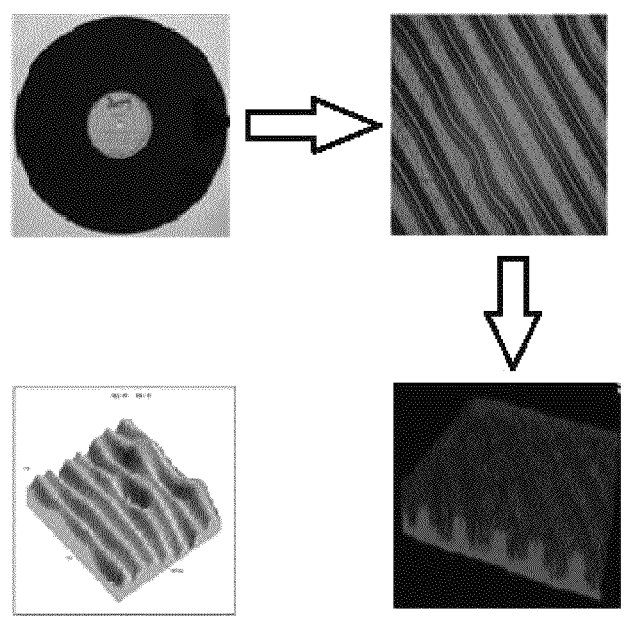
FIG. 16 illustrates an example of generating a 3D image from a 2D groove image.

FIGS. 10a and 10b illustrate an example of an image decomposition of a grayscale image using the ternary numeral system (base-3) with numbers {−1, 0, 1}. FIG. 11 illustrates an example of an image decomposition of a grayscale image using the Phi number system (base-φ) with numerals {0, 1}. FIGS. 12a, 12b and 12c illustrate an example of an image decomposition of a grayscale fingerprint image using a threshold decomposition method. FIGS. 13a and 13b illustrate an example of an image decomposition of a grayscale fingerprint image using EMD. FIG. 14 is an example of cosmetics industry illustrating a configuration of a modeling/dimensionalization 2D images. FIG. 15 illustrates an example of a 2D grayscale fingerprint image converted to a 3D image. FIG. 16 illustrates an example of generating a 3D image from a 2D groove image.

Figure 17:
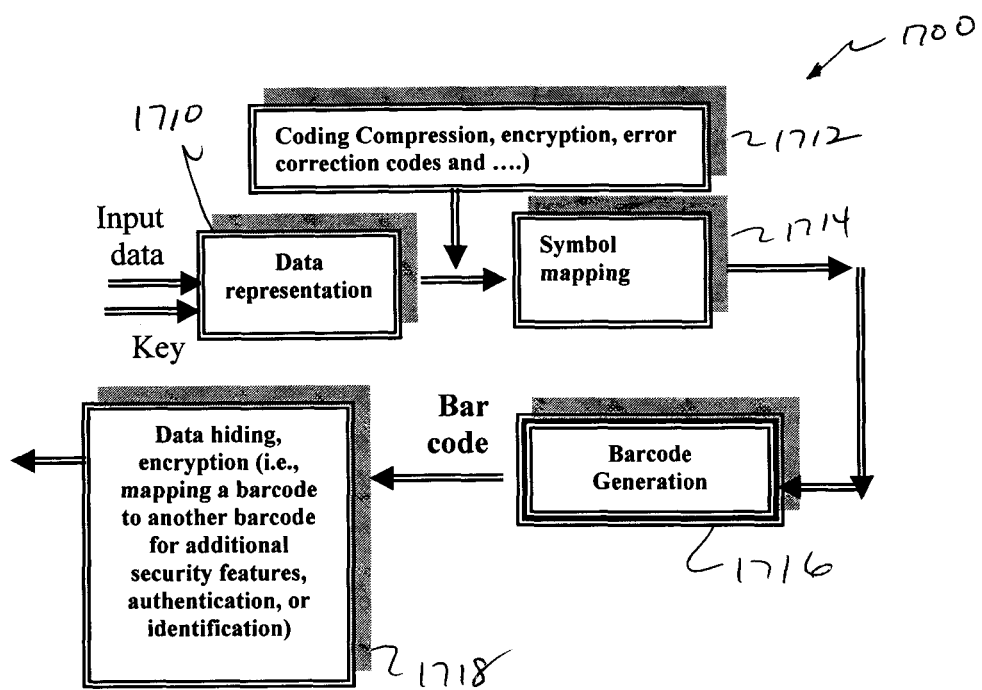
FIG. 17 is a flow diagram illustrating the generating and decoding of a color barcode label with security features.

Referring to FIG. 17, there is illustrated a block diagram 1700 for the generating and decoding of a color barcode-label with security features. Data and an encoding key are input from which data representation is generated 1710. The data is then encoded with coding compression, encryption and error correction codes 1712. The symbol mapping 1714 is then performed on the encoded data. A barcode is then generated 1716 from the mapped data into which data is hidden or encrypted 1718.

Number/Signal Representations

Fibonacci and Lucas Numbers and Generalizations: We now review some number representations, most notably Fibonacci and Lucas numbers and their generalizations. We may classify the numbers into the following:

Extended Fibonacci and Lucas Sequences: Fibonacci and Lucas (F-L) sequences include weighted F-L numbers, F-L p-numbers, n-dimensional (Meta) F-L numbers, and random F-L numbers.

Fibonacci ($f_n$) and Lucas ($l_n$) numbers can be presented recursively as $$f_k = f_{k-1} + f_{k-2}, \quad l_k = l_{k-1} + l_{k-2},\quad (1)$$

where $f_0=0$, $f_1=1$, $l_0=2$, $l_1=1$, $l_2=3$, $k \geq 2$. F-L numbers can be also defined as $$f_n = \frac{\tau^n - \rho^n}{\tau - \rho} = \frac{\tau^n - (-1)^n \tau^{-n}}{\sqrt{5}}, \quad l_n = \tau^n - (-1)^n \tau^{-n}$$

Where $$\lim_{n \to \infty} \frac{f_{n+1}}{f_n} = \tau$$

$\tau$ is a golden ratio.

Weighted Fibonacci and Lucas (F-L) P-Numbers are defined by the following recurrence:

$$F_n^{(p)} = \begin{cases} 0 & \text{if } n \leq 0, \\ 1 & \text{if } 0 < n \leq p+1, \\ aF_{n-1}^{(p)} + bF_{n-p-1}^{(p)} & \text{if } n > p+1 \end{cases} \quad (3)$$

$$L_n^{(p)} = \begin{cases} p+1 & \text{if } n = 0, \\ 1 & \text{if } 0 < n \leq p, \\ aL_{n-1}^{(p)} + bL_{n-p-1}^{(p)} & \text{if } n > p \end{cases} \quad (4)$$

where a and b are some constants and p is a non-negative integer. In the following, we consider the case in which a=b=1. Note that F-Lucas p-number representations include an "infinite" number of various representations. For values p=0 and p=1, for instance, the F-L p-representations respectively reduce to the well-known binary, powers of two sequence, and F-L systems previously discussed. As $p \to \infty$, the F-L p-representations become the "unitary code" in which $$X = \underbrace{1 + 1 + \ldots + 1}_{x}.$$

Other number systems can be generated by varying the value of p.

n-Dimensional Random Fibonacci Sequences: Random Fibonacci sequences have been introduced as a stochastic variation of the classical Fibonacci sequence: These are random sequences fk defined by their first two terms $f_o$, and $f_1$ ($f_0=0$, $f_1=1$) and the recurrence relation $$f_k = f_{k-1} \pm f_{k-2}.$$

For example, if the random selection gives two minuses followed by three plusses, another minus, etc., the resulting random Fibonacci sequence is 0, 1, 1, 0, −1, −1, −2, −3, −1, etc. In [40] Viswanath consider the more general Fibonacci-like recurrence $f_k = \pm f_{k-1} \pm f_{k-2}$ and each sign is chosen independently and at random with probability ½. Random Fibonacci sequences are related to many fields, such as continued fractions, products of random matrices, dynamical systems, condensed matter physics.

k-Generalized Fibonacci Numbers: n-dimensional (generalized) Fibonacci sequences is defined as [ ]:

$$F_n^{(k)} = F_{n-1}^{(k)} + F_{n-2}^{(k)} + \ldots + F_{n-k}^{(k)} \quad (k \text{ terms})$$

where k≥2 and with initial conditions 0, 0, . . . , 0, 1 (k terms) such that the first non-zero term is $F_1^{(k)}=1$
These numbers are also called the Fibonacci k-step numbers, Fibonacci k-sequences, or k-bonacci numbers.
For k=3, 4, 5, . . . , k, . . . theses sequences are called Tribonaccis, Tetranacci, Pentanacci, and so on k-bonacci numbers.

Definition of the Meta-Fibonacci Sequences: A meta-Fibonacci sequence that is a sequence given by a Fibonacci type recursion, where the recursion varies with the index.

A natural stochastic modification of the Fibonacci sequence is to allow both additions and subtractions.

Definition: We define the following sequences:

$$F_n^{(p)} = \begin{cases} a & \text{if } n=0, \\ b_n & \text{if } 0 < n \le m, \, b_n \text{ are constant}, \, m=p \text{ or } p+1 \\ c_1 F_{n-1}^{(p)} + c_2 F_{n-2}^{(p)} + \ldots + c_{p+1} F_{n-p-1}^{(p)} \; n > m \end{cases}$$

And called it
a) weighted n-dimensional (p,n) Fibonacci sequences if the coefficients $c_i$ are $a_1, a_2, \ldots, a_k$ are arbitrary real or complex numbers
b) random n-dimensional (p,n) Fibonacci sequences if the coefficients $c_i$ is chosen randomly.
For instance, by choosing $c_i$ from the following classes: $\{0,1\}, \{-1,0,1\}, \{0,1,2\}, \{j,1, \text{where } j^2=-1\}$, we can generate many well known and newly developed number sequences such as the Fibonacci p-numbers (2); the Lucas p-numbers (3) the tribonacci numbers; the Trucas numbers, the tetranacci numbers, the r-bonacci numbers; the weighted Fibonacci numbers, the Gaussian Fibonacci numbers, a new class of the number sequence, which we call Fibonacci (q,p)-numbers, and satisfy the following recursion:

$$F_n^{(p)} = \begin{cases} 0 & \text{if } n \le 0, \\ 1 & \text{if } 0 < n \le p+1, \\ F_{n-1}^{(p)} + F_{n-q-1}^{(p)} + F_{n-p-1}^{(p)} & \text{if } n > p+1 \; q < p \end{cases}$$

Definition: Weighted random n-dimensional Negofibonacci/Negolucas numbers can be defined as:

$$F_{-n}^{(p)} = (-1)^n F_n^{(p)}, \text{ or, } F_{n,n-2}^{(p)} = F_n^{(p)} - F_n^{(p)}$$

is called an n-digit two-dimensional logarithmic representation of X.
We call the limit of ratio of the successive n-dimensional meta-Fibonacci numbers $$\lim_{n \to \infty} \frac{F_{n+1,j}^{(k)}}{F_{n,j}^{(k)}} = \mu$$

n-dimensional Meta-Golden ratio.
If we take p=1,j=1, k=2, then the sequence of Fibonacci p-numbers is reduced to the well-known Fibonacci sequence golden ratio.

Definition: Consider the n-dimensional meta-Fibonacci-like recurrence $$FR_{n,j}^{(k)} = \begin{cases} a & \text{if } n \le 0, \\ FR_m^{(k)} = b_e & \text{if } m=1, 2, \ldots k-1, \, c_i^k; b_e \text{ are constant} \\ c_1^k FR_{n-q_1}^{(k)} * c_2^k FR_{n-q_2}^{(k)} * \ldots * c_k^k FR_{n-q_k-j_k}^{(k)} \\ * \text{ is an operation(addition, concatenation, logical,.)} \end{cases}$$

where j=0, 1, 2, . . . ; each $c_i^k$ is chosen randomly or independently from $\{0,1\}$ or, $\{-1,1\}$, or $\{-1,0,1\}$, complex number, or, from R=( ) real axis and where operation * is chosen randomly/independently
This kind of sequences we called operation dependent (n,k,*)-dimensional meta-recursive sequences.

If $c_i=1$, i=1,2* is the logical addition then the Random n-dimensional meta-Fibonacci sequences (RMFS) is the Gray code. An n-bit Gray code $(c_{n-1}, \ldots, c_1, c_0)$ is $$c_i = \begin{cases} a_i \oplus a_{i+1} & 0 \le i \le n-2 \\ a_{n-1} & i = n-1 \end{cases}$$

where, $\oplus$ is the exclusive OR operation.
A Random n-dimensional meta-Fibonacci sequences (RMFS) is also include the (n, k, p)-Gray Code: a sequence $(g_{k-1} \ldots g_1 g_0)_n$ is called (n, k, p)-Gray Code of the sequence $(a_{k-1} \ldots a_1 a_0)_n$ if it is satisfied $$g_i = \begin{cases} a_k & i = k-1 \\ (a_i + a_{i+p+1}) \bmod n & 0 \le i \le k-p-2 \\ a_i & i > k-p-2 \end{cases}$$

where 0≤i≤k−1, n≥2 and 0≤p≤k−1.
If * is the concatenation of k strings then we may get for example the n-Fibonacci string (Fibonacci word) we can be define by:

$$F_n^{(k)} = \begin{cases} a & \text{if } n \le 0, \\ F_m^{(k)} = b_e & \text{if } m=1, 2, \ldots k-1, \, b_e \text{ are constant} \\ c_1^k F_{n-q_1}^{(k)} \oplus c_2^k F_{n-q_2}^{(k)} \oplus \ldots \oplus c_k^k F_{n-q_k-1}^{(k)} \\ c_i^k, i=1, \ldots k-1 \text{ are constant} \end{cases}$$

(p,q) Fibonacci Like Numbers-Definition: Given integers p≥1 and q≥1, the (p,q,*) Fibonacci sequence is given by the recurrence relation $$g_k = g_{k-q} * g_{k-q-p}, \quad (3.1)$$

with g(k)=a, for k<0, and $g_0=b_0 \; g_1=b_1 \; g_2=b_2$; and where the sign * is an addition or multiplication operation. Parameters a and $b_i$ i=1,2,3 are called the initial values.

We call the (p,q,*) Fibonacci sequence a family of generalized Fibonacci sequences. Various commonly used sequences are particular cases of the (p,q,*)-fused Fibonacci family:
The classic Fibonacci sequence for $\{p,q,*\}_{a,b}=\{1,1,+\}_{0,1}$ and initial values $f_0=( )$ and $f_1=1.[5]$ The classic Lucas sequence for $\{p,q, *\}=\{1, 1,+\}$ and initial values $l_0=2, l_1=1$.[5]

The Padovan sequence and the Perrin sequence for $\{p,q, *\}=\{1, 2, +\}$ and initial values $d_0=d_1=d_3=1$ and $p_0=3$, $p_1=0$, $p_3=2$, respectively [18] [19].

The following recurrence $$D_n^{(q,p)} = \begin{cases} 0 & \text{if } n \leq 0, \\ 1 & \text{if } 0 < n \leq p+q+1, \\ aF_{n-q} + bF_{n-q-p} & \text{if } n > p+q+1 \end{cases}$$

where a and b are constants and p is a non-negative integer. We call these Fibonacci Like (p,q)-codes.

Multiplicative Fibonacci sequence for $\{p, q, x\}_{a,b}=\{1, 1, x\}_{0,1}$ and initial values $f_0=0$ and $f_1=1$, where the sign * is x the multiplicative operation:

$$1^{f_{k+1}=f_k \times f_{k-1}}, k \geq 0,$$

Examples of the multiplicative Fibonacci sequence are provided in the table below. It can be shown that this sequence can be represented by $$f_{k+1} = 2^{f_{k-2}}, k \geq 1$$

New recursive systems, $g_k=g_{k-m} \times g_{k-n}$ can also be generated. As an example, we treat the initial values, unless otherwise specified, as $g(k)=a$, for $k<0$, and $g_0=b_0$ $g_1=b_1$ $g_2=b_2$, and the sign * as x, the multiplicative operation.

Multiplicative Lucas sequence for $\{p,q,*\}_{a,b}=\{1, 1, x\}_{0,1}$.

$l_k=l_{k-1} \times l_{k-2}$, $k \geq 0$ where the initial values are $l_0=1$ and $l_1=2$ Multiplicative (a,b) sequence for $\{p,q,*\}_{a,b}=\{1, 1, x\}_{0,1}$.

$G_k=2^{f_{k-1}} \times 3^{f_k}$, $k \geq 0$ where the initial values are $G_0=2$ and $G_1=3$ Multiplicative (a,b) sequence for $\{p,q,*\}_{a,b}=\{1, 1, x\}_{0,1}$ $G_k=a^{f_{k-1}} \times b^{f_k}$, $k \geq 0$ where the initial values are $G_0=a$ and $G_1=b$.

We define Multiplicative Padovan, Perrin, and other sequences in a similar manner.
Examples of these sequences are given below.

| P | System | Numbers |
|---|--------|---------|
| 1 | Fibonacci: $f_k = f_{k-1} + f_{k-2}$ $f_0 = 0, f_1 = 1$ | 0, 1, 1, 2, 3, 5, 8, 13, 21, 34, 55, 89, 144, 233, 377, 610, 987, 1597 ... |
| 2 | Lucas $l_k = l_{k-1} + l_{k-2}$ | 2, 1, 3, 4, 7, 11, 18, 29, 47, 76, 123, 199, 322, 521, 843, 1364, 2207 ... |
| 3 | Padovan: $d_k = d_{k-2} + d_{k-3}$ $d_0 = d_1 = d_2 = 1$ | 1, 1, 1, 2, 2, 3, 4, 5, 7, 9, 12, 16, 21, 28, 37, 49, 65, 86, 114, 151, 200 ... |
| 3 | Perrin: $p_k = p_{k-2} + p_{k-3}$ $p_0 = 3, p_1 = 0, p_2 = 2$ | 3, 0, 2, 3, 2, 5, 5, 7, 10, 12, 17, 22, 29, 39, 51, 68, 90, 119, 158, 209 ... |
| 1 | Multiplicative Fibonacci sequence $f_k = f_{k-1} f_{k-2}$ | 1, 2, 2, 4, 8, 32, 256, 8192, 2097152, $1.7179 \times 10^{10}$, 0, $3.602 \times 10^{16}$ ... |
| 2 | Multiplicative Lucas sequence $l_k = l_{k-1} l_{k-2}$ | 2, 1, 2, 2, 4, 8, 32, 256, 8192, 2097152, $1.7179 \times 10^{10}$, $3.602 \times 10^{16}$ ... |
| 3 | Multiplicative Padovan sequence $d_k = d_{k-2} d_{k-3}$ $d_0 = 2, d_1 = d_2 = 1$ | 2, 1, 1, 2, 1, 2, 2, 2, 4, 4, 8, 16, 32, 512, 16384, 8388608, $1.37 \times 10^{11}$ ... |
| 3 | Multiplicative Perrin sequence $p_k = p_{k-2} p_{k-3}$ $p_1 = 1, p_3 = 2$ | 3, 1, 2, 3, 2, 6, 6, 12, 36, 72, 432, 31104, 13436928, $4.1794 \times 10^{11}$ ... |

Table (cont.), $p_0 = 3$:

| P | System | Numbers |
|---|--------|---------|
|   | $p_k = p_{k-2} p_{k-3}$ $p_0 = 3$, $p_1 = 1, p_3 = 2$ |   |

Generalized Phi Number System (GPNS): Below, we introduce a new generalization of the Golden ratio and investigate their properties. We will show that the new generalized Golden ratio contains as a particular case the classical Golden ratio, Golden p-ratio, and plastic ratio/number.

Euclid's problem: The golden section partitions a line segment AB into p-AC "major" segments and a q-"minor" CB sub-segments in such a way that the ratio of the whole and the major equals the ratio of the major and the minor:

$$\frac{AB}{CB} = \frac{CB}{AC}, CB > AC \text{ and } AB = AC + CB$$

It has been shown that the ratio $$\phi = \frac{CB}{AC} = \frac{1 + \sqrt{5}}{2} \approx 1.6180339887.$$

New Generalized Euclid's problem: we generalize the definition golden section by dividing a segment AB with a point C such as $$\frac{CB}{AC} = \left(\frac{AB}{CB}\right)^m, \text{ and } AB = sAC + eCB, \text{ where } m \text{ is a real number}$$

Particularly, if $$m = \frac{p}{q},$$

where m, and n are integers and $n \neq 0$ then this equation can have the following form:

$$\left(\frac{AB}{CB}\right)^p = \left(\frac{CB}{AC}\right)^q, CB > AC, \text{ and}$$

$$AB = sAC + eCB, p = 0, 1, 2, 3, \ldots, q = 1, 2, 3, \ldots$$

Which means the a segment AB must be divided with a point C such as AB=AC+CB, and q power the ratio between the longer part CB and the shorter one AC is equal to the p power of the ratio between the whole line segment AB and the longer part CB.

The Golden p-section if s=e=q=1. The above relationship can be written in the following form:

$$x = \frac{AB}{CB} = \frac{AC + CB}{CB} = \frac{AC}{CB} + 1 = p\frac{1}{\frac{CB}{AC}} + 1 = \frac{1}{x} + 1;$$

-continued $$x = \frac{1}{x} + 1; \Rightarrow x^2 - x - 1 = 0; x_{1,2} = \frac{1 \pm \sqrt{1+4}}{2}$$

The positive root $$x_1 = \phi = \frac{CB}{AC} = \frac{1 + \sqrt{5}}{2} \approx 1.6180339887$$

The Golden p-section if s=e=q=1[27]

$$\frac{CB}{AC} = \left(\frac{AB}{CB}\right)^p, \text{ denoting } x = \left(\frac{AB}{CB}\right)^p x = \frac{sAC + eCB}{CB} =$$

$$s + \frac{1}{\frac{CB}{AC}} e = s + \frac{e}{\left(\frac{AB}{CB}\right)^p} = \frac{e}{x^p} + s \Rightarrow \Rightarrow x^{p+1} - sx^p - e = 0;$$

New Golden p-section: For p=1, and q=1, 2, 3, ..., 1, than the positive root of this equation we called the Generalized Minor Golden Section.

$$\left(\frac{CB}{AC}\right)^q = \frac{AB}{CB} = \frac{sAC + eCB}{CB} = s\frac{AC}{CB} + e = s\frac{1}{\frac{CB}{AC}} + e = s\frac{1}{x} + e;$$

denoting by $x = \frac{CB}{AC} \rightarrow x^q = s\frac{1}{x} + e; \Rightarrow x^{q+1} - ex - s = 0;$ This new generalization of the golden section is carried out by dividing a segment AB into a major and a minor subsegment in such a way that the ratio of the whole and the major equals the q power of ratio of the major and the minor. Recall, that for q=2 the positive root of this cubic equation $$x^3 - x - 1 = 0;$$

is called the plastic number [27,42]. The positive root $\rho$ of this equation we called the generalized plastic number.

According to the table, the result under Fibonacci p-numbers when p=0 gives the traditional powers of two sequence. Furthermore, given a value of p=1 results in the Fibonacci sequence. In summation, 'p' provides a large number of sequences and p-codes that all relate to the Fibonacci sequence. This recursive concept can also be used to generate Lucas p-numbers and p-codes.

| p | 1 | 2 | 3 | 4 | 5 | 6 | 7 |
|---|---|---|---|---|---|---|---|
| $\lim_{n \to \infty} \frac{F_p(n+1)}{F_p(n)} = \tau_p$ | 1.618 | 1.465 | 1.380 | 1.324 | 1.285 | 1.255 | 1.232 |
| $\lim_{n \to \infty} \frac{F_p(n)}{F_p(n+1)} = \rho_p$ | 0.6180 | 0.6823 | 0.7245 | 0.7549 | 0.7781 | 0.7965 | 0.8117 |

We are interested in two problems: the unique representation of positive integers as a sum of a fixed set of natural numbers using what is usually called a system of numeration and the problem of representing uniquely a real number, 0<x<1, as the sum of a series of positive terms, which is usually referred to as a system of representation. When these two systems—that is, both sums—can be expressed in the same way as a unified two-way sequence we may say we have a complete system of numeration. This is the case for the usual decimal system.

We introduce a new number system defined in the solution of the we will investigate a non-negative integer x e representation by a finite sum, $$X = a_k\psi^{km} + a_{k-1}\psi^{(k-1)m} + a_{k-2}\psi^{(k-2)m} + \ldots + a_2\psi^{2m} + a_1\psi^m + a_0 + a_{-1}\psi^{-m} + a_{-2}\psi^{-2m} + a_{-3}\psi^{-3m} + \ldots$$

where $a_i$,m,k are integers and m>0, k=0, 1, 2, 3, ..., $a_i \in (-\psi, \psi)$ and where $\psi$ is the generalized phi number or it is a solution of the equation Generalized Euclid's problem The representation is called the generalized phi number system (GPNS). Varying its coefficients, b,c,m,$a_i$, the GPNS can derive several existing number systems such as traditional phi number system, binary numeral system, ternary numeral systems and many other arbitrary base systems. Examples are shown in the following. Table I shows the different representations of integers from 1 to 20.

For example k=2$\psi$ is a root of $x^2 - bx - c = 0$ than $$\tau = \frac{b + \sqrt{b^2 + 4bc}}{2b}$$

Properties:
If b=1, $\alpha_i$ belongs to {0, 1}, and c=0 than $\tau=1$
If b=1, c=1, m=1, and $\alpha_i$ belongs to {0, 1}, than $$\tau = \frac{1 + \sqrt{5}}{2},$$

which means that the presented representation becomes the Bergman Representation. It has been shown that every positive integer N, there is a unique set of nonconsecutive integer powers of $\tau$.

If b=1, c=2, m=1, and $\alpha_i$ belongs to {0,1} than $\tau$=2-classical binary representation.

If b=1, c=2, m=1, and $\alpha_i$ belongs to {-1,0,1} than $\tau$=2 we get the signed digit representations of number. It has been shown that any integer number 'X', $2^{n-1} \leq X \leq 2^n$, can be represented as:

$$X = a_k 2^k + a_{k-1} 2^{k-1} + a_{k-2} 2^{k-2} + \ldots + a_2 2^2 + a_1 2^1 + a_0,$$

where $a_m \in \{\overline{1}, 0, 1\}$, $\overline{1}$=-1 and m=0, 1, ..., k-1
If b=1, c=1, m=2, and $\alpha_i \in \{\overline{1}, 0, 1\}$ then $$\tau^2 = \frac{3 + \sqrt{5}}{2} \approx 2.618$$

and we get the ternary representations of number X $$X = a_k \tau^{2k} + a_{k-1} \tau^{2k-1} + a_{k-2} \tau^{2k-2} + \ldots + a_2 \tau^4 + a_1 \tau^2 + a_0 + a_{-1} \tau^{-2} + a_{-2} \tau^{-4} + a_{-3} \tau^{-6} + \ldots$$

If b=1, c=6, m=1, and $\alpha_i$ belongs to {0,1,2} than $$\tau = \frac{1+\sqrt{1+24}}{2} = 3$$

The systems in which the digits, the $a_i$ in the sums (1), can only be 0 or 1 are called binary systems.

phi number system: If b=1, c=1, m=1, and $a_i\{0,1\}$, then $$x^2 - x - 1 = 0, \psi = \frac{1+\sqrt{5}}{2},$$

the equation changes to $$X = a_k\psi^k + a_{k-1}\psi^{k-1} + a_{k-2}\psi^{k-2} + \ldots + a_2\psi^2 + a_1\psi + a_0 + a_{-1}\psi^{-1} + a_{-2}\psi^{-2} + a_{-3}\psi^{-3} + \ldots \quad (1)$$

and becomes the traditional phi number system.

Ternary numeral system: If b=1, c=6, m=1, and $a_i \in \{0,1,2\}$, then $x^2 - x - 6 = 0$, $\psi = 3$. The GPNS is the ternary numeral system–a base-3 number system [45. It is defined by, $$X = a_k 3^k + a_{k-1} 3^{k-1} + a_{k-2} 3^{k-2} + \ldots + a_2 3^2 + a_1 3^1 + a_0 3^0 + a_{-1} 3^{-1} + a_{-2} 3^{-2} + a_{-3} 3^{-3} + \ldots$$

where $a_i \in \{0,1,2\}$, and i=0, 1, 2, 3, ..., k.

Ternary τ-representation If b=1, c=1, m=2, and $a_i \in \{-1,0,1\}$, then $$x^2 - x - 1 = 0, \psi^2 = \frac{3+\sqrt{5}}{2} \approx 2.618.$$

The GPNS is the ternary τ-representation defined by, $$X = a_k\psi^{2k} + a_{k-1}\psi^{2(k-1)} + a_{k-2}\psi^{2(k-2)} + \ldots + a_2\psi^4 + a_1\psi^2 + a_0 + a_{-1}\psi^{-2} + a_{-2}\psi^{-4} + a_{-3}\psi^{-6} + \ldots$$

where $a_i \in \{-1,0,1\}$, and i=0, 1, 2, 3, ..., k.

Balanced ternary numeral system: If b=1, c=6, m=1, and $a_i \in \{-1,0,1\}$, then $x^2 - x - 6 = 0$, $\psi = 3$. The GPNS is the balanced ternary numeral *system*. It is defined by, $$X = a_k 3^k + a_{k-1} 3^{k-1} + a_{k-2} 3^{k-2} + \ldots + a_2 3^2 + a_1 3^1 + a_0 3^0 + a_{-1} 3^{-1} + a_{-2} 3^{-2} + a_{-3} 3^{-3} + \ldots$$

where $a_i \in \{-1,0,1\}$, and i=0, 1, 2, 3, ..., k.

The balanced ternary numeral system is also called the ternary symmetrical number system. It is used in comparison logic and ternary computers.

GPNS representation of integers.

| GPNS | b=1, c=2, m=1, $a_i \in \{0,1\}$ Binary number system | b=1, c=1, m=1, $a_i \in \{0,1\}$ Phi number system | b=1, c=1, m=2, $a_i \in \{-1,0,1\}$ Ternary τ-representation | b=1, c=6, m=1, $a_i \in \{0,1,2\}$ Ternary numeral system | b=1, c=6, m=1, $a_i \in \{-1,0,1\}$ Balanced ternary numeral system |
|---|---|---|---|---|---|
| 1 | 1 | 1.0 | 1.0 | 1 | 1 |
| 2 | 10 | 10.01 | 1$\bar{1}$.1 | 2 | 1$\bar{1}$ |
| 3 | 11 | 100.01 | 10.1 | 10 | 10 |
| 4 | 100 | 101.01 | 11.1 | 11 | 11 |
| 5 | 101 | 1000.1001 | 1$\bar{1}$1.$\bar{1}$1 | 12 | 1$\bar{1}\bar{1}$ |
| 6 | 110 | 1010.0101 | 10$\bar{1}$.01 | 20 | 1$\bar{1}$0 |
| 7 | 111 | 10000.0001 | 100.01 | 21 | 1$\bar{1}$1 |
| 8 | 1000 | 10001.0001 | 101.01 | 22 | 10$\bar{1}$ |
| 9 | 1001 | 10010.0101 | 11$\bar{1}$.11 | 100 | 100 |
| 10 | 1010 | 10100.0101 | 110.11 | 101 | 101 |
| 11 | 1011 | 10101.0101 | 111.11 | 102 | 11$\bar{1}$ |
| 12 | 1100 | 100000.101001 | 1$\bar{1}$01.0$\bar{1}$1 | 110 | 110 |
| 13 | 1101 | 100010.001001 | 1$\bar{1}$1.$\bar{1}$.1 $\bar{1}$1 | 111 | 111 |
| 14 | 1110 | 100100.001001 | 1$\bar{1}$10.1 $\bar{1}$1 | 112 | $\bar{1}\bar{1}\bar{1}$ |
| 15 | 1111 | 100101.001001 | 1$\bar{1}$11.1 $\bar{1}$1 | 120 | $\bar{1}\bar{1}$0 |
| 16 | 10000 | 101000.100001 | 10$\bar{1}$1. $\bar{1}$01 | 121 | $\bar{1}\bar{1}$1 |
| 17 | 10001 | 101010.000001 | 100$\bar{1}$.001 | 122 | $\bar{1}$0$\bar{1}$ |
| 18 | 10010 | 1000000.000001 | 1000.001 | 200 | $\bar{1}$00 |
| 19 | 10011 | 1000001.000001 | 1001.001 | 201 | $\bar{1}$01 |
| 20 | 10100 | 1000010.010001 | 101$\bar{1}$.101 | 202 | $\bar{1}$1$\bar{1}$ |

Prime Number System: The prime number sequence is a set of natural numbers which has exactly two natural number divisors "1" and itself. The notion of prime numbers is employed in several braches of mathematics for different applications. The study of prime numbers and its distribution are still an evolving research area by itself. These different aspects motivated various researchers investigate the bit-plane decomposition based on the prime sequence weights. The prime sequence based weights are: [1 2 3 5 7 11 13 17 19 23 29 31 37 41 43]. The reason we include the "1" in the prime weights so to represent every image resolution value in the set of [0-255].

Multiple Base Number Representation Systems:

Now we introduce the Multiple Base Number System (MBNS), a collection or fusion of different number systems. MBNS allows us to represent an integer X with various systems $\{S_n^{(p)}, T_m^{(q)}, \ldots, Z_k^{(l)}\}$ in the form $$X = \sum_{i,j,\ldots,k} s_{i,j} S_n^{(p)} * T_m^{(q)*} \ldots * Z_k^{(l)}, p, q, l = 0, 1, 2, \ldots \quad \text{M1}$$

where * is an arbitrarily chosen "fusion" operation (i.e., addition, multiplication, linear combination, etc.) and $s_{i,j}$ is either real or imaginary. Some noteworthy $s_{i,j}$ values include $s_{i,j} \in \{0, 1\}$, $s_{i,j} \in \{-1,0,1\}$, $s_{i,j} \in \{0,1,j\}$ where $j = \sqrt{-1}$. Also to be noted is that $S_m^{(p)}, Z_n^{(q)}, \ldots, Z_k^{(l)}$ can be both real and complex number systems (see, for example, Table 1). Changing the parameter values in these systems provides greater representation possibilities.

Figure 6:
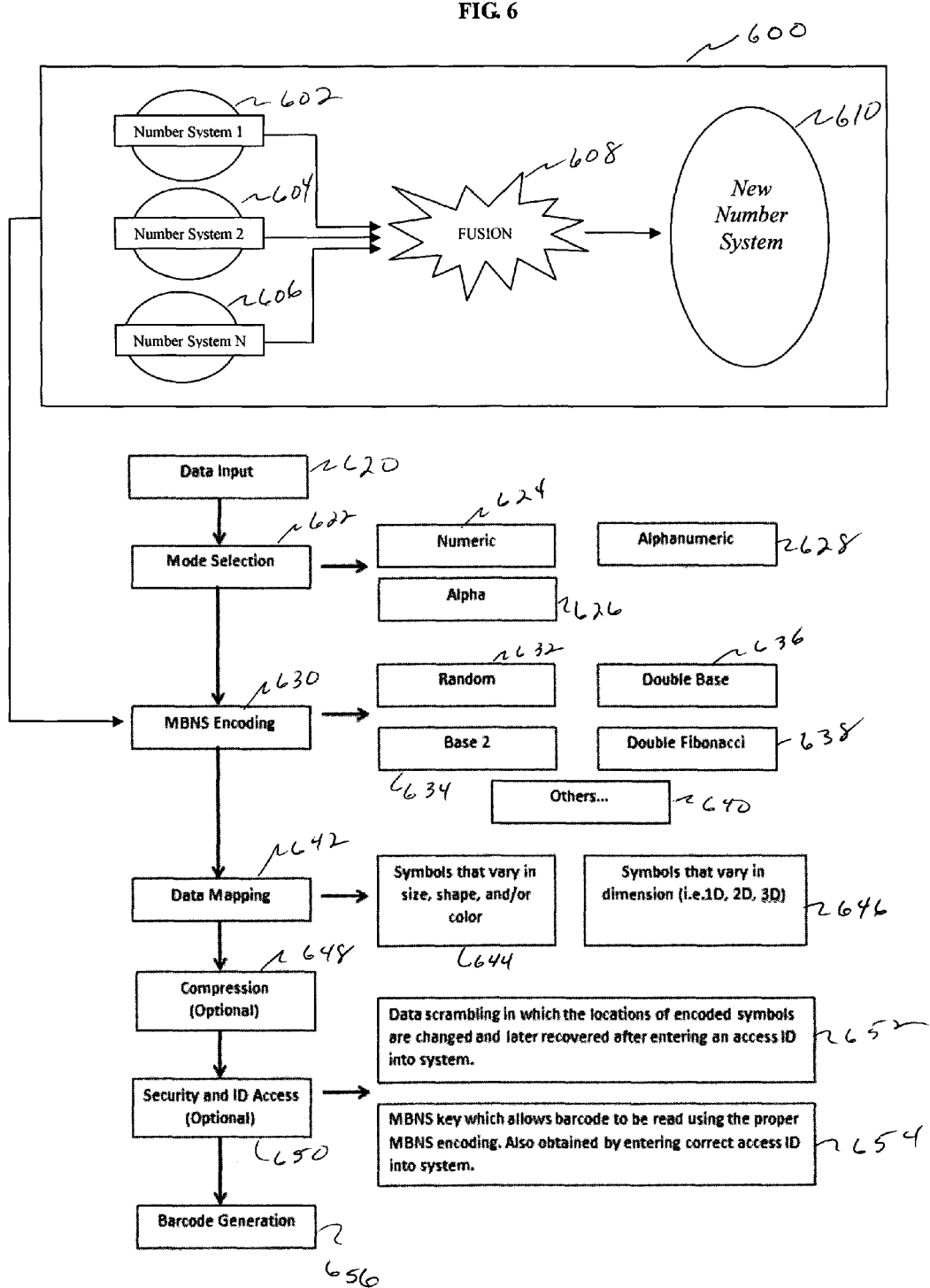
FIG. 6 is a flow diagram illustrating the use of a multiple base number system in the generation of a barcode.

FIG. 6 illustrates the MBNS 600 utilized barcode generation. The data to encoded is input at data input 620. Next, a mode selection occurs 622, in which the data is identified as either numeric 624, alpha 626 or alphanumeric 628. The data is then encoded 630 using the MBNS encoding (block 600) which can be one of random 632, Base 2 634, double base 636, double Fibonacci 638 or another encoding scheme 640. The encoded data is then mapped 642 based on symbols that vary in size, shape and/or color 644 and symbols that vary in dimension 646. Then the optional step of subjecting the mapped data to compression 648 occurs. Then the mapped data can optionally be secured and encoded with ID access 650, 652 and 654. Then a barcode is generated 656.

In FIG. 6, block 600 illustrates the generating a new number system i.e. a Multiple Base Number System (MBNS) 601 through the fusion 608 of number system 602, number system 2 604 and number system N 606. The creation of the MBNS is described in detail immediately below.

Note this system is mapping one dimensional signal into multi-dimensional signal.

Two Base Number Representation System: A subset of MBNS in which two number systems, $S_m^{(p)}$, $T_n^{(q)}$, are fused into a single parametric representation of the form:

$$X = \sum_{i,j} e_{i,j} S_m^{(p)} * T_n^{(q)}, \ p, q, = 0, 1, 2, \ldots \quad (M2)$$

$e_{i,j} \in \{0,1\}$, or $e_{i,j} \in \{-1,0,1\}$, $e_{i,j} \in D = \{0, \ldots, |q|\}$, $q=1, 2, \ldots$ $e_{i,j} \in \{0,1,j,j+1\}$ $j=\sqrt{-1}$ etc. where n, m $\in \{0, 1, 2, 3 \ldots\}$ and p and q are parameters. Examples of (M2), in which we let * be the multiplication operation, are provided below to illustrate the form's versatility.

$S_m^p = 2^m, T_n^q = 1, e_{i,j} \in \{0,1,\}$, gives the radix-2 representation (see 37);

$S_m^p = 3^m, T_n^q = 1, e_{i,j} \in \{0,1,2\}$, gives the radix-3 representation $S_m^p = 2^n, T_n^q, e_{i,j} \in \{0,1\}$, gives the radix-4 representation;

$S_m^p = 2^m$ or $3^m, T_n^q = 1, e_{i,j} \in \{-1,0,1\}$, gives the signed-digit number system (see 37);

$S_m^p = 2^m, T_n^q = 3^n, e_{i,j} \in \{0,1,\}$, gives the double base representation (see 37);

$S_m^p = F_m^p$ or $L_m^p, T_n^q = 1, e_{i,j} \in \{0,1,\}$, gives the F-L p-representation (see 42);

$S_m^p = F_m^p$ or $L_m^p, T_n^q = q^n, e_{i,j} \in \{-1,0,1\}$, gives a so called signed-digit F-L p-representation.

$S_m^p = F_m^p$ or $L_m^p, T_n^q = F_n^q$ or $L_n^q, e_{i,j} \in \{0,1,\}$, gives a new, so called double F-L base p-representation.

Table 1 listed below of parametric representations of numbers explores sample representation systems we can generate from (M2) in greater detail.

These examples emphasize the multiplication representation systems of Fibonacci and Lucas numbers and their variations (i.e., non-weighted/weighted F-L p-numbers), though they can be expanded to include Generalized Golden Ratio numbers and other systems.

We note that it is also possible to fuse these representations using addition:

$$X = \sum_{i,j} e_{i,j} \{a F_{n+1}^{(p)} + b T_{m+1}^{(q)} + d\}, \ p, q, = 0, 1, \ldots, k-1, \quad (M3)$$

where a, b and d are constants. This linear combination of systems may lead to interesting representations such as $$X = \sum_{k} e^{k} \left\{ \frac{1}{2} f_k + \frac{\sqrt{5}}{2} 1_k \right\} \text{ and } X = \sum_{k} e_k \left\{ \frac{1}{2} f_k + \frac{1}{2} 1_k \right\}. \quad (M4)$$

Many such systems are sparse but redundant. That is, they represent data in few terms but offer multiple representation possibilities.

Definition: A number representation of an integer X is called a Non-Adjacent-Form (NAF) if there are no adjacent non-zero digits in presenting X: $e_j e_{j+1} = 0$ for all j.

In order to broaden the use of MBNS, it is necessary to find a means of reducing its redundancy and finding its canonical and non-adjacent form. In the following, we give provides means to satisfy the conditions. As we will see, such conditions provide an additional layer of error correction. For example, if the machine reads a unique Fibonacci code in terms of the binary system as (1,1,0,1), an error will automatically be known. The reason is that no two consecutive Fibonacci numbers can be used in the same sum and consequently, no two ones can occur next to each other.

Example: Let us now apply this generalized table to representing the numbers 15 and 127 using the double base and Fibonacci representation systems.

The integers 15 and 127 can be expressed as a sum double base (left) and Fibonacci (right) numbers. In the latter expression, we use the Fibonacci representation system to form a sum of mixed Fibonacci numbers, represented in the form $$\sum_{m,n} d_{m,n} F_m F_n.$$

We call this system the Double Fibonacci Number System (DFNS) or the Fibonacci Base Number System (FBNS) as it expresses a number as a sum of Fibonacci products.

$$15 = 3^0 2^0 + 3^0 2^1 + 3^1 2^2 \quad 127 = 3^0 2^0 + 3^2 2^1 + 3^3 2^2$$
$$= 3^1 2^0 + 3^1 2^2 \qquad\qquad = 3^0 2^4 + 3^1 2^0 + 3^3 2^2$$
$$= 3^1 2^1 + 3^2 2^0 \qquad\qquad = 3^0 2^0 + 3^1 2^5 + 3^3 2^0$$

Double Base Representation $$15 = F_1 F_0 + F_0 F_5 \quad 127 = F_0 F_1 + F_0 F_6 + F_5 F_4$$
$$= 2(1) + 1(13) \qquad = 1(2) + 1(21) + 8(13)$$
$$= F_2 F_3 = 3(5). \qquad = F_2 F_6 + F_4 F_4 = 3(21) + 8(8)$$

Double Fibonacci Representation

The DBNS and DFNS representation tables or matrices for numbers 15 and 127 are illustrated in FIG. 18.

As we can see from these tables, the DBNS and DFNS for both 15 and 127 are redundant since different combinations of active cells can be used to represent each integer. Note that the maps containing the minimum number of non-zero digits in their representations (i.e. the fewest active cells) are considered canonical double or Fibonacci base number representations (CDBNR or CDFNR).

Reduction Algorithms: A representation system (15) can be made non-adjacentable using the following rules:

a) $A_m B_n + A_{m+1} B_n = A_{m+2} B_n$ (Row Reduction)
$A_m B_n + A_m B_{n+1} = A_m B_{n+2}$ (Column Reduction)

OR b) $A_m B_n + A_m B_{n+1} = A_{m+1} B_n$ (Column Reduction)
$A_m B_n + A_{m+1} B_n = A_m B_{n+2}$ (Row Reduction)

Remark: Condition a) will be satisfied if $A_m$, $B_n$ can be expressed recursively (i.e. as in the case of Lucas and Fibonacci numbers and their variants, namely weighted and non-weighted Lucas and Fibonacci p-numbers), or as multiples of the Golden Ratio. Condition b) will be satisfied if the product of $A_m$ and $B_n$ gives an integer of the form:

$$x = \sum_{m,n} d_{m,n} p^m q^n, d_{m,n} \in \{0, 1\}^1, \text{ where } A_m = p^m, B_n = q^n.$$

Proofs to the abovementioned reduction algorithms that remove consecutive active cells lying in one row or column are now provided. Refer to FIG. 19 for block diagrams illustrating these reduction algorithms.

Case A: $A_m$ is expressed recursively and $B_n$ as a multiple of the Golden Ratio. Similar proofs can be provided for cases in which both $A_m$ and $B_n$ are either recursively defined or multiples of the Golden Ratio Proof: Let $A_m$ be expressed recursively, $B_n \tau^n$. Recall that $\tau^2 = 1 + \tau$.

Row Reduction: $A_m B_n + A_{m+1} B_n = A_m \tau^n + A_{m+1} \tau^n = \tau^n (A_m + A_{m+1}) = \tau^n (A_{m+2})$ Column Reduction: $A_m B_n + A_m B_{n+1} = A_m \tau^n + A_m \tau^{n+1} = A_m \tau^n (1+\tau) = A_m \tau^{n+2} = A_m B_{n+2}$ Possible systems that follow under this case include:

$$\sum_{m,n} d_{m,n} F_m F_n, \sum_{m,n} d_{m,n} F_m L_n \sum_{m,n} d_{m,n} L_m L_n$$

Case B: The product of $A_m$ and $B_n$ gives an integer of the form: $A_m = p^m$, $B_n = q^n$.

Proof: Let $A_m = p^m$, $B_n = q^n$, $p = 1+q$ (i.e. $p=3, q=2$).

Row Reduction: $A_m B_n + A_{m+1} B_n = p^m q^n + p^{m+1} q^n = p^m q^n (1+p) = p^m q^n (2+q) = 3^m 2^{n+2} = A_m B_{n+2}$ Column Reduction: $A_m B_n + A_m B_{n+1} = p^m q^n + p^m q^{n+1} = p^m q^n (1+q) = p^{m+1} q^n = 3^{m+1} 2^n = A_{m+1} B_n$ Possible systems that follow under this case include:

$$x = \sum_{m,n} d_{m,n} p^m q^n, d_{m,n} \in \{0, 1\}^1, \text{ where } A_m = p^m, B_n = q^n.$$

Thus far, we have determined how to reduce existing representations of form (M3). We will now offer a means of finding MBNS representations.

MBNS and the Greedy Algorithm: In order to find a multiple base expansion, the Greedy approach is used to determine the best approximation of a certain integer, compute the difference, and reapply the process. The general formula for expanding multiple base representations is $$n = \sum_{i=1}^{l} s_i A_{a_i} B_{b_j},$$

where S is a set of predefined coefficients. Note that this formula allows for the introduction of nontrivial coefficients in multiple base expansions. For traditional multiple base expansions, which we will consider in the following, $s_i = 1$. To illustrate the formula, let n=841232. By setting $A_{a_i} = F_{a_i}$ or $3^{a_i}$, $B_{b_j} = f_{b_j}$ or $2^{b_j}$, we can generate a Fibonacci or double base expansion of n using the Greedy Algorithm.

Fibonacci Expansion:
841232=832040+9192→9192=8362+830→830=754+76→76=68+8

Double Base Expansion:
841232=$2^7 3^8$+1424→1424=$2^4 3^4$+128→128=$2^7 3$

The Greedy Algorithm does not always produce a canonic representation. For example, consider the integer X=49 expressed in DFNS. The representation produced by the Greedy Algorithm is X=21*2+6*1+1*1. However, the canonic representation (only one such form exists for the integer 49) is X=13*3+5*2. Determining the canonical form of MBNS is often difficult, especially for very large integers. The Greedy Algorithm is thus used as a straightforward means of producing a near-to-canonic form. Integers represented using the Greedy Algorithm can have varying representation efficiencies based on the chosen MBNS. That is, the minimal number of nonzero digits needed to represent each integer changes with respect to the chosen representation system of the form (14). In the following, we compare two MBNS's generated from (14), namely the double base and the Fibonacci expansions, to see which system is more efficient in representing integers.

We begin our comparison between the double base and Fibonacci expansions by analyzing the possible direct products or terms generated by each system. Tables 2 and 3 provide all double base and Fibonacci products less than 10,000. Note that terms <100, >100 and <1000, >1000 and <10,000 are represented with green, yellow, and orange cells, respectively. Table 4 summarizes these results.

$$\sum_{m,n} d_{m,n} F_m \tau_n, \sum_{m,n} d_{m,n} L_m \tau_n \sum_{m,n} d_{m,n} \tau_m \tau_n \text{ where } d_{m,n} \in \{0, 1\}$$

From these data tables, we can see that the Fibonacci and double base expansions are both very sparse. Still, the Fibonacci system seems to represent many numbers with fewer terms. We can attribute this to the fact that the Fibonacci system increases at a slower pace (though still quite quickly) than the double base system. As a result, more integers are represented as direct products of Fibonacci numbers than of binary and ternary numbers. For example, we can see that there are 101 different Fibonacci products less than 10,000 (26 below 100, 32 below 1000 and above 100, and 43 below 10,000 and above 1000). In comparison, there are only 67 double base products less than 10,000 (20 below 100, 20 below 1000 and above 100, and 27 below 10,000 and above 1000). An interesting observation here is that as we allow the number limit to increase (say from below 1000 to below 10000), the number of Fibonacci products increases more than the number of double base products (double base: 20→27, Fibonacci: 32→43). In other words, the difference in the number of Fibonacci and double base products increases as we allow our number range to increase (from 12=32−20 to 16=43−27). Generally, given its larger representation of numbers, which becomes more prominent as we allow our number range to increase, the Fibonacci product sequence is more efficient in representing numbers while maintaining a high degree of sparseness. We test this idea on various integers.

Table 5 provides near canonical Fibonacci and double base expansions of integers ≤100 calculated using the Greedy Algorithm. From the table, we see that in nearly half of the integers considered one method of expansion fares better than the other. That is, one system uses fewer terms to represent the respective integer. In 30 cases (represented by green cells), the Fibonacci system is more efficient in representing the given integer. In contrast, the double base system is more efficient in only 19 cases (represented by red cells). For the remaining cases (represented by non-shaded cells), both representation systems use the same number of terms to express the given integer. We can continue testing our prediction.

Table 6 provides the Fibonacci and double base expansions of integers 101-200. From the table, we see that the Fibonacci system is more efficient 37 times (represented by green cells) while the double base is more efficient only 21 times (represented by red cells). This data further affirms the idea that Fibonacci systems are more often than not more efficient in representing given integers. That is, the Fibonacci systems represent many more numbers with fewer terms than double base systems. As the number of Fibonacci products increases more than the number of double base products, we expect the Fibonacci system to generally become even more efficient as our given integer value increases (of course, there are exceptions to this expectation: consider, for instance, the above example X=841232 discussed above). Embodiments of the present invention may be configured to determine which representation to use.

Decomposition Signals into Sliced Signals

Fibonacci/Lucas p-code/number Binary Number System based image decomposition (Decomposition signal into sliced signals): The Fibonacci/Lucas p-code/number based bit-plane decomposition (p=0 case reduces to commonly used binary bit-plane decomposition) intends to decompose image I (i,j) into several binary bit-planes. Each image pixel I(i,j) and thus the whole image can be decomposed into k binary values;

$$I(i, j) = \sum_{n}^{k-1} a_n(i, j) F_p^n, x_n \in \{0, 1\}, n = 0, 1, \ldots, k-1$$

Where each digit, or bit, '$a_n$' from $I \Leftrightarrow (a_{k-1}, a_{k-2}, \ldots, a_2, a_1, a_0)_2$ is either a '0' or '1'

Each bit-plane contains the corresponding bits of the binary representation of all image pixels. For example, the 4th bit-plane consists of the 4th bits of all image pixels. These bit planes are loosely related with n sliced images, where MSB plane corresponds to slice image with the weights $F_p^n$ and LSB plane corresponds to slice image with the with the weights 1. Original image, I(i,j), can be reconstructed from its bit planes $a_n(i,j)$ n=k−1, k−2, . . . 0. Bit planes of image Lena are shown in FIGS. 8-11, arranged in the ascending order from MSB ($a_o$ (i,j) to LSB ($a_7$(i,j))

The pixel intensity values of a digital image are non-negative integers. In the same manner of binary bit-plane decomposition, a digital image can also be composed into several GPNS bit-planes. This is called GPNS bit-plane decomposition. Since the base of the GPNS could be an irrational number, a rational number, or an integer. Therefore the GPNS bit-planes may consist of binary bits or arbitrary-base bits. Moreover, the traditional binary bit-plane decomposition is a special case of the GPNS bit-plane decomposition when e=1, s=2, m=1, and $a_i \in \{0,1\}$.

Threshold Decomposition Example[51]: Let X be an L-valued signal/image with elements $0 \leq X_n < L$. Then the L-valued signal can be decomposed in many binary signals/images (cross sections) by thresholding it at each scale level. A cross section at level m is given by the set of all pixels greater or equal m $$x_n^m = \sigma_m(X_n) = \begin{cases} 1 & \text{if } X_n \geq m \\ 0 & \text{otherwise} \end{cases}$$

The L-valued signal/image can be uniquely reconstructed from its cross sections.

$$X_n = \sum_{m=1}^{L-1} x_n^m$$

Another image slicing example: Modified Empirical Mode Decomposition (MEMD) is a signal decomposition technique. This technique carries out a sifting process to decompose the signal into a set of components called Intrinsic Mode Functions (IMFs) and a residue. A basic advantage of EMD is that the basis functions are derived from the signal itself. By adding the IMFs and the residue we can reconstruct the original signal without any loss. The decomposition procedure can be described as:

Step 1: find all the local minima and all the local maxima in the image,
Step 2: interpolate the local maxima and minima to form the upper surface, $S_{max}(x,y)$, $S_{min}(x, y)$
Step 3: apply a filter
Step 4: Denote d(x,y) with the difference of original image, I(x, y) and m(x, y):

$$d(x, y) = I(x, y) - \frac{aI(x, y) + bm(x, y)}{a + b}, \text{ where}$$

$$m(x, y) = \frac{1}{2} S_{max}(x, y) + \frac{1}{2} S_{min}(x, y)$$

is the mean of the upper and the lower surfaces, and a, and b are some constants
Step 5: Repeat this process k times until d(x,y) is an IMF.
Step 6: estimated First IMF, $imf_1(x, y)$ is as:

$$d_{1k} = d_{1(k-1)} - \frac{ad_{1(k-1)} + bm_{1k}(x, y)}{a + b},$$
$$inf f_1(x, y) = d_{1k}$$

Step 7: Subtract $imf_1(x, y)$ from the original image $$R_1(x,y) = I(x,y) - imf_1(x,y)$$

Step 8: Find $R_1(x, y)$ as a new signal and repeat the above procedure n times. The iteration is expressed as:

$$R_n(x,y) = R_{n-1}(x,y) - imf_n(x,y)$$

The original image can be constructed by summing all the IMFs and the residue without any loss.

$$I(x, y) = R_n(x, y) + \sum_{i=1}^{n} imf_i(x, y)$$

Where I(x, y) is the original image, $R_n(x, y)$ is the i-th Intrinsic Mode Function (Image slices see FIG. 13), and $R_n(x, y)$ is the residue.

Key dependent, Random Number Representation Based Barcodes

In this section, we present several illustrative examples to show that above generated key dependent number representation systems can be used for generation of bar code systems as they not only contain Fibonacci representation based barcodes but also a multitude of other classes of barcodes, including the commonly used binary barcodes. To provide an extra layer of security, one may encrypt the terms of a given system using different types of encryption methods. This key dependent number representation systems can be chosen to be more robust against mistakes. FIG. 2 presents a block diagram of generating and decoding of a color barcode with security features.

Illustrative Examples of generation 1-D Barcodes: Let's generate the UPC barcodes of the zip code 78249 by using black-white and color approaches in both ternary (base 3) and Fibonacci representations.

Input: The zip code 78249

Step 1. Choose a parametric/random number representation method among class of number representation methods.

Step 2. Convert the zip code 78249 into the Fibonacci based binary code:

$$7=0*F_1+1*F_2+0*F_3+1*F_5+0*F_8 \Leftrightarrow (0,1,0,1,0)$$

$$8=0*F_1+1*F_2+0*F_3+1*F_5+0*F_8 \Leftrightarrow (0,0,0,0,1)$$

$$2=0*F_1+1*F_2+0*F_3+1*F_5+0*F_8 \Leftrightarrow (0,1,0,0,0)$$

$$4=0*F_1+1*F_2+0*F_3+1*F_5+0*F_8 \Leftrightarrow (1,0,1,0,0)$$

$$9=0*F_1+1*F_2+0*F_3+1*F_5+0*F_8 \Leftrightarrow (1,0,0,0,1)$$

Or, $$78249 \Leftrightarrow 0,1,0,1,0,0,0,0,0,0,1,0,1,0,0,0,1,0,1,0,0,1,0,0,0,1.$$

Step 3. Apply an error correction/encryption procedure

Step 4. Choose the symbol mapping procedure

Figure 20:
FIG. 20 illustrates an exemplary embodiment of forming a barcode representation of zip code 78249.
Figure 20:
Figure 20:
Figure 20:

FIG. 20 offers various ways of forming a barcode representation of this zip code, which is represented in terms of a binary sequence in non-adjacent form.

Step 5. Generate Barcode

Output: 1-d barcode. See FIG. 21. Note that if there are an odd number of binary integers, the barcode sequence begins with $F_0$ instead of $F_1$. The advantage of using this method is that it provides a higher density (in bits per unit length) of information than that of other cases. FIG. 6 shows how our method can store 8 digits in 36 bits in comparison to the 64 bits needed by current methods.

Figure 21:
FIG. 21 illustrates a barcode representation of zip code 78249 in the binary sequence.
Figure 21:
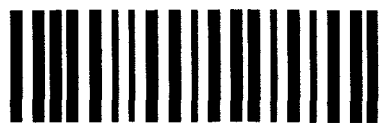
Figure 21:
Figure 21:
Figure 21:
Figure 21:
Figure 21:
Figure 21:
Figure 21:
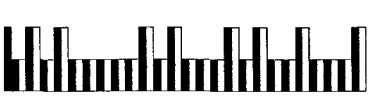

FIG. 21 further illustrates other data to barcode mappings to generate UPC barcodes of zip code 78249.

Illustrative Examples of generation 1-D Color Barcodes: If there are r bar code colors, the bar code that uses that color scheme represents numbers in base r=3 or by using the signed digit number system and color barcodes. One exemplary code (in the RGB color space) is illustrated in Table 8.

Below we demonstrate various ways of forming color barcodes. As an example we will use the zip code 78249. First, we convert the zip code into the signed digit number system binary code:

$$7=8-1=0\times2^4+1\times2^3+0\times2^2+0\times2+1\times2^0 \Leftrightarrow (0\ 1\ 0\ 0\ -1)$$

$$8=0\times2^4+1\times2^3+0\times2^2+0\times2+0\times2^0 \Leftrightarrow (0\ 1\ 0\ 0\ 0)$$

$$2=0\times2^4+0\times2^3+0\times2^2+1\times2+0\times2^0 \Leftrightarrow (0\ 0\ 0\ 1\ 0)$$

$$4=0\times2^4+0\times2^3+1\times2^2+0\times2+0\times2^0 \Leftrightarrow (0\ 0\ 1\ 0\ 0)$$

$$9=8+1=0\times2^4+1\times2^3+0\times2^2+0\times2+1\times2^0 \Leftrightarrow (0,1,0,0,1)$$

Figure 22:
FIG. 22 illustrates a UPC barcode representation of zip code 78249.
Figure 22:
Figure 22:
Figure 22:
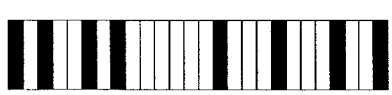
Figure 23:
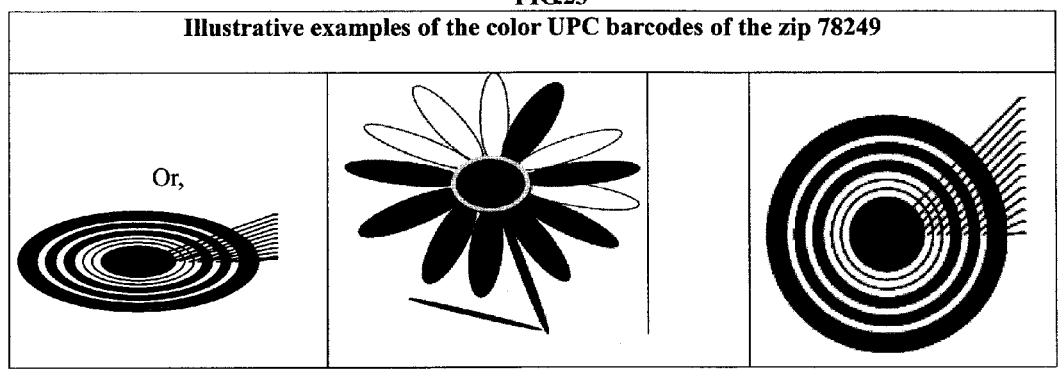
FIG. 23 illustrates a UPC color barcode representation of zip code 78249.

From above equation, it can be inferred that this zip code can be uniquely represented as sequence of "−1"", "0", and "1": 0 1 0 0 −1 0 1 0 0 0 0 0 0 1 0 0 0 1 0 0 0 1 0 0 1. FIGS. 22 and 23 illustrate UPC color barcode representations of zip code 78249.

Illustrative Examples: Stacked symbology, also called multi-row code, is created by "stacking" a series of linear barcode on top of each other Illustrative Examples of Fibonacci P-code based Barcodes: The advantage of using Fibonacci (p,q)-codes over commonly used Fibonacci and binary codes lies in amount of possible sequences. Consequently, codes become more secure as there is no feasible way to extract the information within the barcode without knowing the exact set of unique p-codes used. The addition of (p,q)-codes to the Fibonacci system thus provides for bar codes that are hard to detect. Secondly, (p,q)-codes provide for a more universal generation of a bar\code system as they not only contain Fibonacci representation barcodes but also a multitude of other classes of barcodes, including the commonly used binary barcodes.

Figure 24:
FIG. 24 illustrates UPC barcode representations of 123456 for P=0, 1, 2, 3, 4 respectively and $\alpha=\beta=1$ FIG. 25 illustrate flow diagrams illustrating the conversion of data to UPC barcode representations.

FIG. 24 illustrates UPC barcode representations of 123456 for p=0,1,2,3,4 respectively and $\alpha=\beta=1$. These numerous arrangements show that the symbols 123456 are secure against unauthorized detection.

In addition using signed the digit number system binary code; we can introduce signed digit rational, transcendental, Fibonacci and Lucas p-codes, golden ratio base based codes, and other representation systems. Based on these representations one may generate a new class of black-white (binary), color, and invisible secure bar codes.

Illustrative Examples of 2-D Barcodes: We will now apply MBNS representations such as FBNS to construct more efficient and error resistant barcode systems. We consider 2D barcodes as they expand traditional 1D barcode information capacities by adding the vertical array of bars and spaces. By examination of mobile phone cameras and the normal use cases, the minimum requirements of the 2D codes for camera phones are identified. They are a) Matrix codes are preferred to Stacked codes. b) Code size should grow proportionally to the data and have no sudden "jumps." c) Code should be easily detected and read regardless of its size and data amount. d) Code should have read flexibility so that it can be read under any angle. 2D code should also be efficient and widely supported. For instance, although 2D barcodes can be of any shape, most are made up of squares and rectangles due to pixel efficiency. Moreover, 2D barcodes are often not found in color and grayscale as black and white barcodes are more widely supported and allow for faxing and photocopying without losing readability. Taking these criteria into account, we propose representing the input data with MBNS representations such as DBNS and FBNS. The procedures for generating of 2-D barcodes based on the MBNS are outlined in the block diagrams of FIG. 10. Note that for enhanced security, both algorithms also use encryption techniques. As MBNS representations are sparse, they are efficient in representing given data and can lead to high performance barcodes. In general, these systems are also well equipped for error correction. In the following, we test our algorithms against the traditional base 2 representation used in QR code. Though our algorithms are explained through a numeric example, they can be extended to different types (numeric, alphabetic, alpha-numeric, etc.) and languages of information.

Figure 25:
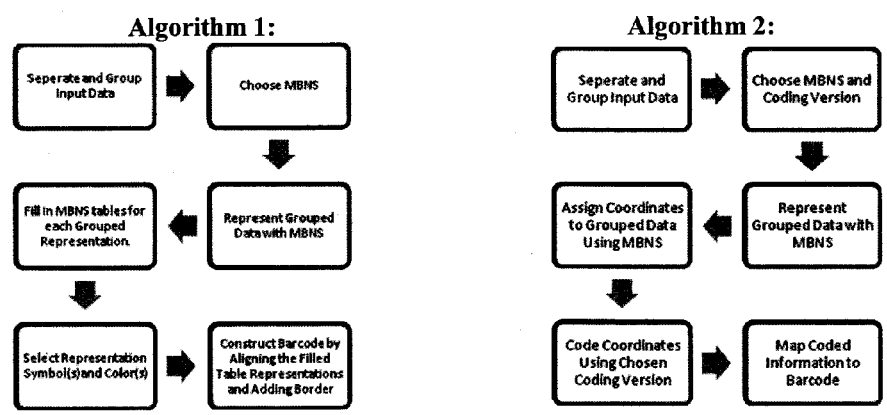

FIG. 25 illustrates 2 block diagrams, Algorithm 1 and Algorithm 2, which illustrate embodiments of converting input data to bar coded information.

Algorithm 1 (illustrated in FIG. 25): Using the Double Base Number System to Represent Input Data "78249"

Separate the data "78249" into one bit groups: "7", "8", "2", "4", and "9".

Choose a representation system: DBNS or FBNS.

Determine each groups DBNS representation, for instance by using the Greedy Algorithm.

DBNS: $7=3^02^0+3^12^1$; $8=3^02^3$; $2=3^02^1$; $4=3^02^2$; $9=3^22^0$

FBNS: $7=F_0F_0+F_1F_2$; $8=F_0F_4$; $2=F_0F_1$; $4=F_1F_1$; $9=F_2F_2$

Figure 26:
FIG. 26 illustrates the generating of a 2D barcode utilizing a multiple base number system.
Figure 26:
Figure 26:
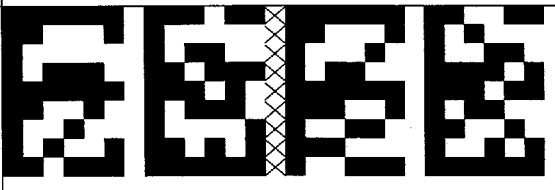
Figure 26:
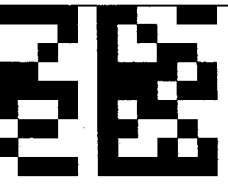
Figure 26:
Figure 26:
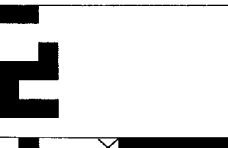
Figure 26:
Figure 26:
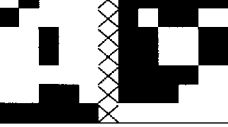

FIG. 26 presents block diagrams of 2-D barcodes generated by using the double base and multiple base number systems.

Fill in MNBS tables for each group representation and align them adjacently to one another. Though we can select from various representation symbols and colors, we here construct our barcode from black and white squares for pixel efficiency. We also add a boarder to our barcode by an outlining row and column. This way we can easily preserve the table format that we used in our generation.

Figure 27:
FIG. 27 illustrates the DBMS Table and barcode and the FBNS Table and barcode.
Figure 27:
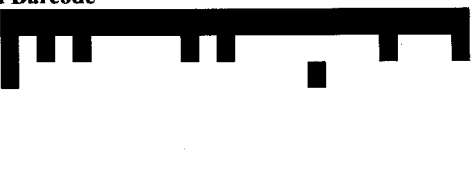

FIG. 27 presents the block diagrams of the a) DBNS Table and Barcode and b) FBNS Table and Barcode. Note that because of repetition, we can construct modified FBNS tables without losing representation possibilities. In this case, we can ignore the last two rows (or columns). We can also represent the number 9 as 8*1+1*1 instead of as 3*3, and get rid of one additional column (or row). The FBNS barcode in FIG. 12 is generated using this idea.

Algorithm 2 (illustrated in FIG. 25) We can vary the following elements of our algorithms: the number of elements in a group, the representation system, the code for representing coordinates, the matrix holding the code representation, and the barcode shape, color, and boarder. We now provide several versions of Algorithm 2 and show how they can be applied to coding the data "78249." FIG. 28 provides several versions of Algorithm 2 that are applied to coding the data "78249."

EXAMPLE 1

Using DBNS or FBNS to Represent the Data "78249" in Version A or B

Separate the data into one bit groups.
"7" "8", "2", "4", and "9".
Choose a representation system.
DBNS or FBNS
Determine each digit's DBNS or FBNS representation.
DBNS using Greedy Algorithm: $7=3^02^0+3^12^1$; $8=3^02^3$; $2=3^02^1$; $4=3^02^2$; $9=3^22^0$ Construct a DBNS or FBNS table and shade all the cells represent one term representations. For DBNS, these the cells represent the digits "8", "2", 4", and "9". For FBNS, such cells also represent the digit "5". FIG. 29 illustrates the DBNS or FBNS representations of the digits "7", "8", "2" 4", and "9"

Determine the coordinates of each shaded cell taking the upper left cell of the table to have the coordinates (0,0).

DBNS: (0,1), (0,2), (0,3), and (2,0); FBNS: (0,1) (0,2) (0,4) (2,2).

Note the (x,y) coordinates correspond to the exponents of the base 3 and base 2 numbers or the subscripts of the Fibonacci numbers.

Assign cell coordinates to multi-term representations.

DBNS: coordinates (2,1), (2,2) chosen to represent the digits "5","7" respectively.

FBNS: coordinate (2,4) chosen to represent the digit "7".

Code coordinates.
DBNS (Version A): 10100011000100101000
FBNS (Version B): 10011010001110100011010101010101100011001

Map coded information to barcode.

Figure 30A:
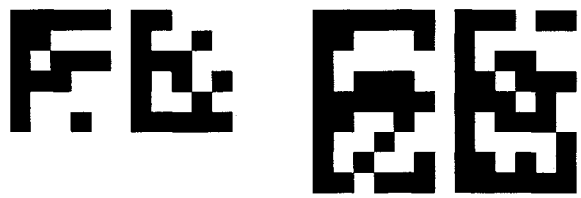
FIG. 30a illustrates the DBNS or FBNS Barcodes using versions illustrated in FIG. 28.
Figure 30A:
Figure 30:
FIG. 30b illustrates the levels of error correction using Algorithm 2 in FIG. 25.
FIG. 30c illustrates the QR code structure.

We construct rectangular (4×5, 5×8) matrices to represent the coded coordinates. All cells are filled in with black and white squares that represent the digits "1" and "0" respectively. We use black and white squares as they are preferred in providing pixel efficient representations (Wang, Zou). A boarder is then added to the matrix to generate the barcode. As the images below indicate, a matrix arrangement and boarder can be chosen in a variety of ways. FIG. 30 illustrates the DBNS or FBNS barcodes using versions A and B.

EXAMPLE 2

Using DBNS or FBNS to Represent the Data "78249" in Version C or D

Separate the data 78249 into groups of two or less.
"78", "24", "9."
Choose a representation system.
DBNS or FBNS
Determine each group's DBNS or FBNS representation.
DBNS: $3^22^3+3^12^1, 3^12^3, 3^22^0$
FBNS: 68+10, 24, 9, or $F_7F_1+F_3F_1, F_4F_2, F_2F_2$ Construct a DBNS or FBNS table and determine the coordinates of each shaded cell.

As noted above, the (x,y) coordinates correspond to the exponents of the base 3 and base 2 numbers or the subscripts of the Fibonacci numbers. Thus, constructing representation tables, though recommended, is not necessary.

DBNS: (2,3) (1,1), (1,3), (2,0); FBNS: (7,1) (3,1), (4,2), (2,2).

Code coordinates using Version D.
Version C (DBNS): 1010010110010101010101010101100110 010011
Version D (FBNS): 01111100111001001100011001010001010101

Map coded information to barcode.

With 38 digits to represent, we construct an 8×5 or 5×8 matrix and fill in the empty matrix entries with 0's Due to redundancy in systems such as FBNS, we are often not limited to shading in a particular cell and have the possibility of choosing a cell we find more conducive to easy reading (i.e., a cell that is not adjacent to any other filled cells). FIG. 30 further illustrates the DBNS or FBNS Barcodes using versions C and D.

Error Correction and Code Versions: The Code Versions are generated using Hadamard matrices, which can be used to define some error correction codes. Though Version A may be the most compact, it may not be used for all MBNS systems and does not provide the error correction capabilities of the others. Hadamard code can be used to correct n/4−1 errors and detect n/4 errors in an n-bit encoded block. The table below illustrates some of the various levels of error correction using versions of Algorithm 2. Though code that can reach a data correction level of 15% is regarded as satisfactory (Kato, Tan), we can reach a level of up to 25%. FIG. 30a illustrates the levels of error correction using Algorithm 2.

Comparison to QR Code: We now test our method against that used in QR Code. In order to make this comparison, a brief overview of how QR code is generated is provided below. Input data in QR Code can be represented in several modes, as illustrated in the table below. Each mode has a corresponding four-bit-long binary representation as well as a separate bit count for a group of input characters. For instance, the binary representation and reserved bit count for mode numeric is 0001 and 10, respectively; for alphanumeric mode, 0010 and 9, respectively. The binary representation corresponding to the input data is placed at the beginning of the encoded QR code. For instance, if we were to encode the zip code "78249", we would begin the code with the bits 0001 and reserve 10 bits for every group of numeric characters in the input data. Below we finish encoding the zip code "78249" in order to specifically illustrate how QR encoding works in numeric mode.

In order to represent 78249 in numeric mode, we group the input data with characters or bits of 3 or less. The data "78249" is separated into one 3 bit and one 2 bit group: "782" and "49". Each full 3 bit group is reserved a 10 bit binary representation. However, if the group contains fewer characters, say 2 or 1 bits, then a 7 or 4 bit binary representation is used respectively. Encoding "782" and "49" in 10 bit and 7 bit binary representations, respectively, we get: 1100001110 0110001. Adding on the binary representation corresponding to the QR numeric mode gives: 0001 1100001110 0110001. To finish encoding the examples, we take the representation arrange it into 8 bit groups. 0's are added to groups at the end of these representations that have less than 8 characters: "78249"→00011100 00111001 10001000. This is done to fit the size of the QR code, which varies according to which version is used. QR code has versions from 1 to 40, where version 1 (used here) is a 21×21 matrix and each following version increases in length and width by 4 cells so that version 40 is a 177×177 matrix. It should be noted that QR code is utilized up to version 10 for camera phones as a greater density exceeds the capabilities of a camera as an imager and thus cannot be successfully decoded (Kato, Tan). This final code can be mapped to a barcode as seen in FIG. 30b.

QR code has four levels of error correction: L, M, Q, and H. About 7%, 15%, 25%, and 30% or less of errors can be corrected with each respective level. It is implemented using Reed-Solomon Code, which requires twice the amount of codewords to be corrected. In the presented example, the total codewords that need to be corrected are 24, requiring 48 additional error correcting codewords. In comparison, Algorithm 1 and 2 use 50 and 20 codewords, respectively, to encode the same data without error correction. At this stage, both algorithms offer exceptionally easy reads and security features. Error correction features can be added. For instance, we can achieve a similar error correction level using Version E in Algorithm 2 with only 70 codewords. Note that the custom design capability of both algorithms, including variations in shape, size, color, and coding representation, allows the symbol to provide additional security. A more general comparison of QR code, Algorithm 1, and Algorithm 2 is provided in FIG. 18. The same idea can be used to generate a class of multidimensional secure color barcode with enhanced reliable and high capacity features.

Figure 31:
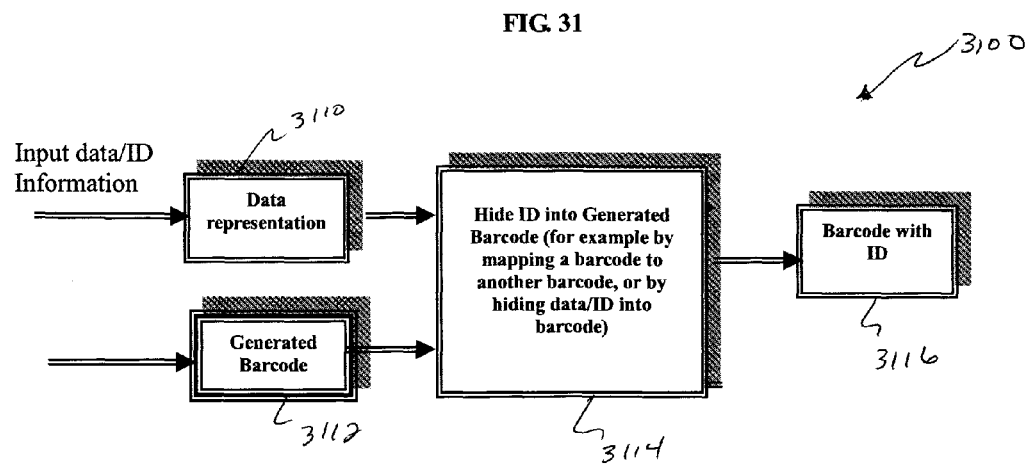
FIG. 31 is a block diagram illustrating the generating of a barcode with ID features for barcode authentication or identification.

FIG. 31 is block diagram 3100 illustrating the generating of a barcode with ID features for barcode authentication or identification. As illustrated input data 3110 and a generated barcode 3112 are combined to generated a barcode with a hidden ID 3114 from which the barcode with ID is generated 3116.

Figure 32:
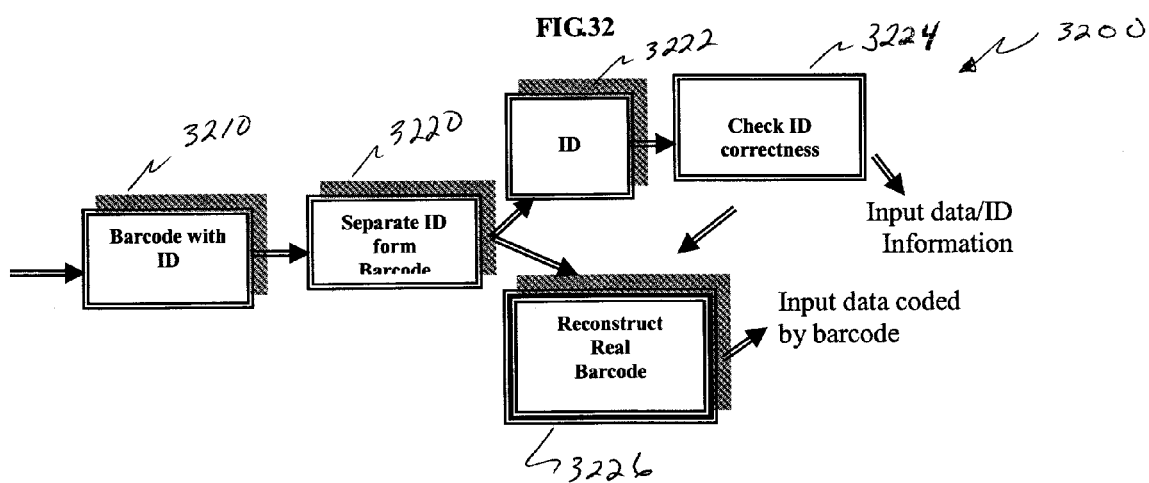
FIG. 32 is a block diagram illustrating the decoding of a barcode with identification.

FIG. 32 is a block diagram 3200 illustrating the decoding of a barcode with identification as similarly generated in FIG. 31. As illustrated the barcode with ID 3210 input is received from which the ID is separated from the barcode data 3220. The ID is then separated 3222 and checked for authentication 3224. The original/real barcode is separated and reconstructed 3226 and if the ID authentication is approved, the real barcode generated and outputted.

Figure 33:
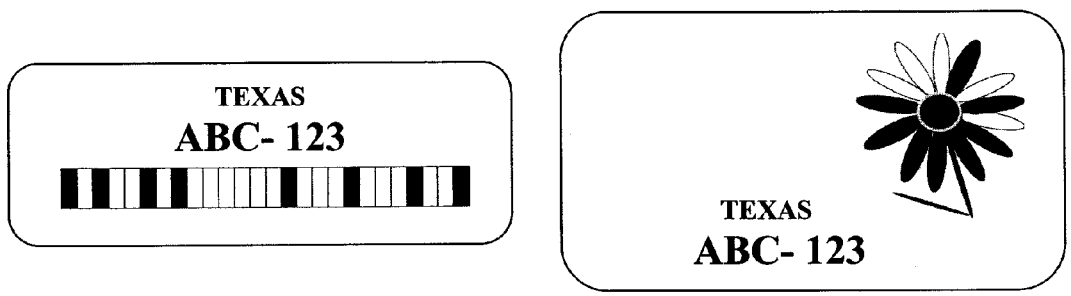
FIG. 33 illustrates variation of a barcode created from a license plate.

FIG. 33 illustrates variations of a barcode created from a license plate.

The present invention has been described above with the aid of functional building blocks illustrating the performance of certain significant functions. The boundaries of these functional building blocks have been arbitrarily defined for convenience of description. Alternate boundaries could be defined as long as certain significant functions are appropriately performed. Similarly, flow diagram block may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

Table 1 of Parametric Representations of Numbers

| Case | $F_{k-1}^P$ | Representation |
| --- | --- | --- |
| Signed Binary | $2^k$ | $a_k 2^k + a_{k-1} 2^{k-1} + a_{k-2} 2^{k-2} + \ldots + a_2 2^2 + a_1 2^1 + a_0$, $a_m \in \{-1, 0, 1\}$ (6) |
| Signed Ternary | $3^k$ | $b_k 3^k + b_{k-1} 3^{k-1} + b_{k-2} 3^{k-2} + \ldots + b_2 3^2 + b_1 3^1 + b_0$, $b_m \in \{-1, 0, 1\}$ or $\{0, 1, 2\}$ (7) |
| Signed General | $r^k$ | $c_k r^k = c_{k-1} r^{k-1} + c_{k-2} r^{k-2} + \ldots + c_2 r^2 + c_1 r^1 + c_0$, $c_m \in \{0, \pm 1, \pm 2, \ldots, \pm(r-1)\}$ (8) |
| P-Fibonacci | $F^{(p)}_k$ | $b_k F^{(p)}_k + b_{k-1} F^{(p)}_{k-1} + \ldots + b_2 F^{(p)}_2 + b_1 F^{(p)}_1$, $b_m \in \{0, 1\}$, $F^{(p)}_m$ is a Fibonacci p-number $\leq X$ (11) |
| Double Base | $p^k q^u$ | $d_{k,u} p^k q^u + d_{k-1,u-1} p^{k-1} q^{u-1} + d_{k-2,u-2} p^{k-2} q^{u-2} + \ldots + d_{0,0}$, $d_{m,n} \in \{0, 1\}$, (12) (generalized) $k < u$, $0 \leq d_{m,n} < k$; (specifically) $k = 2, u = 3$ |
| Multidimensional n-digit logarithmic representation[37] | | $X = \sum_{i=1}^{k} s_i \prod_{j=1}^{b} p_j^{e_j^{(i)}}$, $s_i \in \{\bar{1}, 0, 1\}$, where $p_j$; $e_j^{(i)}$ are integers, where $\bar{1} = -1$ and $i = 0, 1, \ldots, k-1$ | is called a multidimensional n-digit logarithmic representation of X.
b is the number of bases used (at least two, the first one, Table 1 of Parametric Representations of Numbers

| Case | $F_{k-1}{}^P$ | Representation |
|---|---|---|
| | | $p_1$ may always be assumed to be 2). |
| signed modified 2-integers | | $X = \sum_{i=1}^{k} s_i 2^{a_i} p^{b_i}$, $s_i \in \{\overline{1}, 0, 1\}$, where $\overline{1} = -1$ and $i = 0, 1, \ldots, k-1$ |
| Prime | $P_k$ | $e_k P_k + e_{k-1} P_{k-1} + \ldots + e_2 P_2 + eP_1$, $e_m \in \{0, 1\}$, $P_m$ is a prime number $\leq X$(12a) |
| Complex base $-1 + j$ representation system | | $X = \sum_{i=1}^{k} s_i(-1+j)^i$, $s_i \in \{0, 1\}$, where $j = \sqrt{-1}$ and $i = 0, 1, \ldots, k-1$ Example: $2 + 3j = (-1+j)^3 + (-1+j) + 1 \Leftrightarrow 1011$ |
| n-dimensional Meta-Golden Ratio Based Number Representation | | $X = a_k \psi^{mk} + \ldots + a_2 \psi^{m2} + a_1 \psi^{m1} + a_0 + a_{-1} \psi^{-m} + a_{-2} \psi^{-m2} + \ldots$ Where $m = 1, 2, 3, \ldots$, (parameter) and where $\psi$ can be a root of $x^k - b_{k-1} x^{k-1} - b_{k-2} x^{k-2} \ldots - b_1 x - b_0 = 0$. m is a constant and $a_i$ particularly $a_i \in \{0, 1\}$, or, $a_i \in \{\overline{1}, 0, 1\}$, |

Table 2 of Double Base Products Less than 10,000

| | 1 | 3 | 9 | 27 | 81 | 243 | 729 | 2,187 | 6,561 |
|---|---|---|---|---|---|---|---|---|---|
| 1 | 1 | 3 | 9 | 27 | 81 | 243 | 729 | 2,187 | 6,561 |
| 2 | 2 | 6 | 18 | 54 | 162 | 486 | 1,458 | 4,374 | 13,122 |
| 4 | 4 | 12 | 36 | 108 | 324 | 972 | 2,916 | 8,748 | 26,244 |
| 8 | 8 | 24 | 72 | 216 | 648 | 1,944 | 5,832 | 17,496 | 52,488 |
| 16 | 16 | 48 | 144 | 432 | 1,296 | 3,888 | 11,664 | 34,992 | 104,976 |
| 32 | 32 | 96 | 288 | 864 | 2,592 | 7,776 | 23,328 | 69,984 | 209,952 |
| 64 | 64 | 192 | 576 | 1,728 | 5,184 | 15,552 | 46,656 | 139,968 | 419,904 |
| 128 | 128 | 384 | 1,152 | 3,456 | 10,368 | 31,104 | 93,312 | 279,936 | 839,808 |
| 256 | 256 | 768 | 2,304 | 6,912 | 20,736 | 62,208 | 186,624 | 559,872 | 1,679,616 |
| 512 | 512 | 1,536 | 4,608 | 13,824 | 41,472 | 124,416 | 373,248 | 1,119,744 | 3,359,232 |
| 1,024 | 1,024 | 3,072 | 9,216 | 27,648 | 82,944 | 248,832 | 746,496 | 2,239,488 | 6,718,464 |
| 2,048 | 2,048 | 6,144 | 18432 | 55,296 | 165,888 | 497,664 | 1,492,992 | 4,478,976 | 13,436,928 |
| 4,096 | 4,096 | 12288 | 36864 | 110,592 | 331,776 | 995,328 | 2,985,984 | 8,957,952 | 26,873,856 |
| 8,192 | 8,192 | 24576 | 73728 | 221,184 | 663,552 | 1,990,656 | 5,971,968 | 17,915,904 | 53,747,712 |

TABLE 3

Comparison of Double Base and Fibonacci Products Less than 10,000

| Terms Below | Double Base | Double Fibonacci | Terms In Common |
|---|---|---|---|
| 100 | 20 | 26 | 10 |
| 1000 | 40 | 58 | 13 |
| 10,000 | 67 | 101 | 14 |

Table 4 of Near Canonical Fibonacci and Double Base Expansions of Integers $\leq 100$

| | 1 | 2 | 3 | 4 | 5 | 6 | 7 | 8 | 9 | 10 |
|---|---|---|---|---|---|---|---|---|---|---|
| Double Base | 1 | 2 | 3 | 4 | 4 + 1 | 6 | 6 + 1 | 8 | 9 | 9 + 1 |
| Fibonacci | 1 | 2 | 3 | 4 | 5 | 6 | 6 + 1 | 8 | 9 | 10 |

Table 4 of Near Canonical Fibonacci and Double Base Expansions of Integers ≤100

|  | 11 | 12 | 13 | 14 | 15 | 16 | 17 | 18 | 19 | 20 |
|---|---|---|---|---|---|---|---|---|---|---|
| Double Base | 9 + 2 | 12 | 12 + 1 | 12 + 2 | 12 + 3 | 16 | 16 + 1 | 18 | 18 + 1 | 18 + 2 |
| Fibonacci | 10 + 1 | 10 + 2 | 13 | 13 + 1 | 15 | 16 | 16 + 1 | 16 + 2 | 16 + 3 | 16 + 4 |

|  | 21 | 22 | 23 | 24 | 25 | 26 | 27 | 28 | 29 | 30 |
|---|---|---|---|---|---|---|---|---|---|---|
| Double Base | 18 + 3 | 18 + 4 | 18 + 4 + 1 | 24 | 24 + 1 | 24 + 2 | 27 | 27 + 1 | 27 + 2 | 27 + 3 |
| Fibonacci | 21 | 21 + 1 | 21 + 2 | 24 | 25 | 26 | 26 + 1 | 26 + 2 | 26 + 3 | 26 + 4 |

|  | 31 | 32 | 33 | 34 | 35 | 36 | 37 | 38 | 39 | 40 |
|---|---|---|---|---|---|---|---|---|---|---|
| Double Base | 27 + 4 | 32 | 32 + 1 | 32 + 2 | 32 + 3 | 36 | 36 + 1 | 36 + 2 | 36 + 3 | 36 + 4 |
| Fibonacci | 26 + 5 | 26 + 6 | 26 + 6 + 1 | 34 | 34 + 1 | 34 + 2 | 34 + 3 | 34 + 4 | 39 | 40 |

|  | 41 | 42 | 43 | 44 | 45 | 46 | 47 | 48 | 49 | 50 |
|---|---|---|---|---|---|---|---|---|---|---|
| Double Base | 36 + 4 + 1 | 36 + 6 | 36 + 6 + 1 | 36 + 8 | 36 + 9 | 36 + 9 + 1 | 36 + 9 + 2 | 48 | 48 + 1 | 48 + 2 |
| Fibonacci | 39 + 2 | 42 | 42 + 1 | 42 + 2 | 42 + 3 | 42 + 4 | 42 + 5 | 42 + 6 | 42 + 6 + 1 | 42 + 8 |

|  | 51 | 52 | 53 | 54 | 55 | 56 | 57 | 58 | 59 | 60 |
|---|---|---|---|---|---|---|---|---|---|---|
| Double Base | 48 + 3 | 48 + 4 | 48 + 4 + 1 | 54 | 54 + 1 | 54 + 2 | 54 + 3 | 54 + 4 | 54 + 4 + 1 | 54 + 6 |
| Fibonacci | 42 + 9 | 42 + 10 | 42 + 10 + 1 | 42 + 10 + 2 | 55 | 55 + 1 | 55 + 2 | 55 + 3 | 55 + 4 | 55 + 5 |

|  | 61 | 62 | 63 | 64 | 65 | 66 | 67 | 68 | 69 | 70 |
|---|---|---|---|---|---|---|---|---|---|---|
| Double Base | 54 + 6 + 1 | 54 + 8 | 54 + 9 | 64 | 64 + 1 | 64 + 2 | 64 + 3 | 64 + 4 | 64 + 4 + 1 | 64 + 6 |
| Fibonacci | 56 + 6 | 56 + 6 + 1 | 63 | 64 | 65 | 65 + 1 | 65 + 2 | 68 | 68 + 1 | 68 + 2 |

|  | 71 | 72 | 73 | 74 | 75 | 76 | 77 | 78 | 79 | 80 |
|---|---|---|---|---|---|---|---|---|---|---|
| Double Base | 64 + 6 + 1 | 72 | 72 + 1 | 72 + 2 | 72 + 3 | 72 + 4 | 72 + 4 + 1 | 72 + 6 | 72 + 6 + 1 | 72 + 8 |
| Fibonacci | 68 + 3 | 68 + 4 | 68 + 5 | 68 + 6 | 68 + 6 + 1 | 68 + 8 | 68 + 9 | 68 + 10 | 68 + 10 + 1 | 68 + 10 + 2 |

|  | 81 | 82 | 83 | 84 | 85 | 86 | 87 | 88 | 89 | 90 |
|---|---|---|---|---|---|---|---|---|---|---|
| Double Base | 81 | 81 + 1 | 81 + 2 | 81 + 3 | 81 + 4 | 81 + 4 + 1 | 81 + 6 | 81 + 6 + 1 | 81 + 8 | 81 + 9 |
| Fibonacci | 68 + 13 | 68 + 13 + 1 | 68 + 15 | 68 + 16 | 68 + 16 + 1 | 68 + 16 + 2 | 68 + 16 + 3 | 68 + 16 + 4 | 89 | 89 + 1 |

|  | 91 | 92 | 93 | 94 | 95 | 96 | 97 | 98 | 99 | 100 |
|---|---|---|---|---|---|---|---|---|---|---|
| Double Base | 81 + 9 + 1 | 81 + 9 + 2 | 81 + 12 | 81 + 12 + 1 | 81 + 12 + 2 | 96 | 96 + 1 | 96 + 2 | 96 + 3 | 96 + 4 |
| Fibonacci | 89 + 2 | 89 + 3 | 89 + 4 | 89 + 5 | 89 + 6 | 89 + 6 + 1 | 89 + 8 | 89 + 9 | 89 + 10 | 89 + 10 + 1 |

Table 5 of Near Canonical Fibonacci and Double Base Expansions of Integers 101-200

|  | 101 | 102 | 103 | 104 | 105 | 106 | 107 | 108 | 109 | 110 |
|---|---|---|---|---|---|---|---|---|---|---|
| Double | 96 + 4 + 1 | 96 + 6 | 96 + 6 + 1 | 96 + 8 | 96 + 9 | 96 + 9 + 1 | 96 + 9 + 2 | 108 | 108 + 1 | 108 + 2 |
| Fibonacci | 89 + 10 + 2 | 102 | 102 + 1 | 104 | 105 | 105 + 1 | 105 + 2 | 105 + 3 | 105 + 4 | 110 |

|  | 111 | 112 | 113 | 114 | 115 | 116 | 117 | 118 | 119 | 120 |
|---|---|---|---|---|---|---|---|---|---|---|
| Double | 108 + 3 | 108 + 4 | 108 + 4 + 1 | 108 + 6 | 108 + 6 + 1 | 108 + 8 | 108 + 9 | 108 + 9 + 1 | 108 + 9 + 2 | 108 + 12 |
| Fibonacci | 110 + 1 | 110 + 2 | 110 + 3 | 110 + 4 | 110 + 5 | 110 + 6 | 110 + 6 + | 110 + 8 | 110 + 9 | 110 + 10 |

|  | 121 | 122 | 123 | 124 | 125 | 126 | 127 | 128 | 129 | 130 |
|---|---|---|---|---|---|---|---|---|---|---|
| Double | 108 + 12 | 108 + 12 | 108 + 12 + 3 | 108 + 16 | 108 + 16 + 1 | 108 + 18 | 108 + 18 | 128 | 128 + 1 | 128 + 2 |
| Fibonacci | 110 + 10 | 110 + 10 | 110 + 13 | 110 + 13 | 110 + 15 | 110 + 16 | 110 + 16 | 110 + 16 | 110 + 16 | 110 + 16 |

|  | 131 | 132 | 133 | 134 | 135 | 136 | 137 | 138 | 139 | 140 |
|---|---|---|---|---|---|---|---|---|---|---|
| Double | 128 + 3 | 128 + 4 | 128 + 4 + 1 | 128 + 6 | 128 + 6 + 1 | 128 + 8 | 128 + 9 | 128 + 9 + | 128 + 9 + | 128 + 12 |
| Fibonacci | 110 + 21 | 110 + 21 | 110 + 21 + 2 | 110 + 24 | 110 + 25 | 110 + 26 | 110 + 26 | 110 + 26 | 110 + 26 | 110 + 26 |

Table 5 of Near Canonical Fibonacci and Double Base Expansions of Integers 101-200

|  | 141 | 142 | 143 | 144 | 145 | 146 | 147 | 148 | 149 | 150 |
|---|---|---|---|---|---|---|---|---|---|---|
| Double | 128 + 12 | 128 + 12 | 128 + 12 + 3 | 144 | 144 + 1 | 144 + 2 | 144 + 3 | 144 + 4 | 144 + 4 + | 144 + 6 |
| Fibonacci | 110 + 26 | 110 + 26 | 110 + 26 + 6 | 144 | 144 + 1 | 144 + 2 | 144 + 3 | 144 + 4 | 144 + 5 | 144 + 6 |

|  | 151 | 152 | 153 | 154 | 155 | 156 | 157 | 158 | 159 | 160 |
|---|---|---|---|---|---|---|---|---|---|---|
| Double | 144 + 6 + | 144 + 8 | 144 + 9 | 144 + 9 + | 144 + 9 + 2 | 144 + 12 | 144 + 12 | 144 + 12 | 144 + 12 | 144 + 16 |
| Fibonacci | 144 + 6 + | 144 + 8 | 144 + 9 | 144 + 10 | 144 + 10 + 1 | 144 + 10 | 144 + 13 | 144 + 13 | 144 + 15 | 144 + 16 |

|  | 161 | 162 | 163 | 164 | 165 | 166 | 167 | 168 | 169 | 170 |
|---|---|---|---|---|---|---|---|---|---|---|
| Double | 144 + 16 | 162 | 162 + 1 | 162 + 2 | 162 + 3 | 162 + 4 | 162 + 4 + | 162 + 6 | 162 + 6 + | 162 + 8 |
| Fibonacci | 144 + 16 | 144 + 16 | 144 + 16 + 3 | 144 + 16 | 165 | 165 + 1 | 165 + 2 | 168 | 169 | 170 |

|  | 181 | 182 | 183 | 184 | 185 | 186 | 187 | 188 | 189 | 190 |
|---|---|---|---|---|---|---|---|---|---|---|
| Double | 162 + 18 | 162 + 18 | 162 + 18 + 3 | 162 + 18 | 162 + 18 + 4 | 162 + 24 | 162 + 24 | 162 + 24 | 162 + 27 | 162 + 27 |
| Fibonacci | 178 + 3 | 178 + 4 | 178 + 5 | 178 + 6 | 178 + 6 + 1 | 178 + 8 | 178 + 9 | 178 + 10 | 178 + 10 | 178 + 10 |

|  | 191 | 192 | 193 | 194 | 195 | 196 | 197 | 198 | 199 | 200 |
|---|---|---|---|---|---|---|---|---|---|---|
| Double | 162 + 29 | 192 | 192 + 1 | 192 + 2 | 192 + 3 | 192 + 4 | 192 + 4 + | 192 + 6 | 192 + 6 + | 192 + 8 |
| Fibonacci | 178 + 13 | 178 + 13 | 178 + 15 | 178 + 16 | 178 + 16 + 1 | 178 + 16 | 178 + 16 | 178 + 16 | 178 + 21 | 178 + 21 |

Table 6 of the Five Colors Used in Basic Barcode Design

| Black | 0 | 0 | 0 | 0 |
|---|---|---|---|---|
| Blue | 0 | 0 | 0 | 1 |
| Green | 0 | 1 | 0 | 0 |
| Red | 1 | 0 | 0 | 0 |
| Yellow | 0 | 0 | 1 | 0 |

The invention claimed is:

1. A method for converting, in a processing unit, media in a first dimension to a second higher order dimension, comprising:

representing receiving first dimension media content, comprising symbols, letters, text, data, signals, images, video, and audio, into numerical data;

representing receiving first dimension media numerical data into numerical sequences by applying a system underlain by representation systems, comprising parametric number representation systems, weighted Fibonacci and Lucas p-numbers based decomposition systems, binary number representation system, random n-dimensional system, (p,n)-Fibonacci/Lucas sequences based decomposition system, k-Generalized Fibonacci/Lucas numbers based decomposition systems, n-dimensional Meta-Golden ratio based decomposition system, Generalized Phi number system based decomposition system, prime number system based decompositions, Empirical Mode Decomposition, threshold decomposition, and Polynomial binarization;

decomposing the represented data into a plurality of the second dimension signals being of higher order or equal that the first dimension;

using the plurality of signals, generating data representing the media content in a third dimension, the third dimension being of higher order than the second dimension; and generating a media output representing the data in the third dimension.

2. The method of claim 1, wherein the decomposing step includes a Multiple Base Number System (MBNS), with the MBNS including a combination of fused representation systems which includes computing:

$$X = \sum_{i=1}^{m} s_{i,p,q} S_i(p, q), \text{ where } S_i(p, q) = \bigcap_{l=p}^{q} F_i^{(l)} \text{ } q \text{ and } p \text{ are integers,}$$

where $$-\{S_i(p, q)\}$$

are various real and complex number representation systems and where ∩ is a fusion operation comprising addition and multiplication and further includes Signed Binary, Signed Ternary, Signed General, P-Fibonacci, Prime number systems, Complex base −1+j representation system, wherein;

a. The n-dimensional meta-Fibonacci-like recurrence systems:

$$FR_{n+1,j}^{(k)} = \begin{cases} a \text{ if } n \leq 0, \\ FR_n^{(k)} = b_e \text{ for an integer } n \geq 1, b_e \text{ are constants} \\ \bigcap_{q_i=0}^{q_k} c_i^{(k)} FR_{n-q_i-j_k}^{(k)} q_k \text{ and } j_k \text{ are integers, } c_i^{(k)} \text{ are constants} \\ \text{where } \bigcap \text{ is an operation} \end{cases}$$

where j is an integer, each $c^k_i$ is chosen randomly or independently from {0,1}, {−1,1}, {−1,0,1}, or the set of real or complex number, and where operation ∩ is chosen randomly or independently, and further wherein;

b. Fibonacci Like Number is given by the recurrence:

$$g_{k+1} = g_{k-q} \square g_{k-q-p}$$

where given integers $p \geq 4$ and $q \geq 1$, $g_k = a$, for $k<0$, and $g_0 = b_0$ $g_1 = b_1$ $g_2 = b_2$; and where the sign $\square$ is an addition or multiplication operation.

3. The method of claim 1, wherein decomposing step contains Two Base Number Representation System computing:

$$X = \sum_{i,j} e_{i,j} S_m^{(p)} * T_n^{(q)}, \; p \text{ and } q \text{ are integer-parameters}$$

Where $$e_{i,j} \in \{0, 1\}, \; e_{i,j} \in \{-1, 0, 1\}, \; e_{i,j} \in \{0, 1, j, j+1\}, \; j = \sqrt{-1}$$

where n and m are integer numbers, and p and q are integer-parameters, * be the multiplication operation;

$$S_m^p = 2^m, \; T_n^q = 1, \; e_{i,j} \in \{0, 1\},$$
$$S_m^p = 3^m, \; T_n^q = 1, \; e_{i,j} \in \{0, 1, 2\},$$
$$S_m^p = 2^n = T_n^q, \; e_{i,j} \in \{0, 1\},$$
$$S_m^p = 2^m \text{ or } 3^m, \; T_n^q = 1, \; e_{i,j} \in \{-1, 0, 1\},$$
$$S_m^p = 2^m, \; T_n^q = 3^n, \; e_{i,j} \in \{0, 1\},$$
$$S_m^p = F_m^p \text{ or } L_m^p, \; T_n^q = 1, \; e_{i,j} \in \{0, 1\},$$
$$S_m^p = F_m^p \text{ or } L_m^p, \; T_n^q = q^n, \; e_{i,j} \in \{-1, 0, 1\},$$
$$S_m^p = F_m^p \text{ or } L_m^p, \; T_n^q = F_n^q \text{ or } L_n^q, \; e_{i,j} \in \{0, 1\},$$

where $F_i^p$, $L_i^p$ are the Fibonacci Like Number and p-Lucas Fibonacci Like Number.

4. The method of claim 2, wherein the MBNS includes a Double Generalized parametric Golden Ratio based number system which expresses any number as a sum of parametric Fibonacci products.

5. The method of claim 2, wherein the MBNS includes a Double parametric Fibonacci Base Number Representation System which expresses any number as a sum of parametric Generalized Golden Ratio computing $$X = \sum_{i,j} e_{i,j} F_m^{(p)} * L_n^{(q)}, \; p \text{ and } q \text{ are integer-parameters}$$

Where $F_m^{(p)}, L_n^{(q)}$, are Fibonacci Like Numbers, and solution of the Generalized Euclid's problem and $$e_{i,j} \in \{0, 1\}, \text{ or } e_{i,j} \in \{-1, 0, 1\}, \; e_{i,j} \in \{0, 1, j, j+1\} \; j = \sqrt{-1}$$

6. The method of claim 2, wherein the MBNS includes a Double parametric Lucas Base Number Representation System which expresses any number as a sum of parametric Generalized Golden Ratio, computing:

$$X = \sum_{i,j} e_{i,j} F_m^{(p)} * L_n^{(q)}, \; p \text{ and } q \text{ are integer-parameters}$$

Where $F_m^{(p)}, L_n^{(q)}$, are Lucas Like Numbers, solution of the Generalized Euclid's problem, and Ratio of $$= \frac{\text{The n-dimensional Lucas-like recurrence systems}}{(n-1)\text{dimensional Lucas-like recurrence systems}}$$

and $$e_{i,j} \in \{0, 1\}, \text{ or } e_{i,j} \in \{-1, 0, 1\}, \; e_{i,j} \in \{0, 1, j, j+1\} \; j = \sqrt{-1}$$

7. The method of claim 2, wherein the MBNS includes a combination of at least two of binary, ternary, signed parametric Fibonacci and, parametric Lucas, signed Bergman, signed transcendental, signed digit, and double base representations, includes computing:

$$X = \sum_{i=1}^{m} s_{i,p,q} F_i(p, q), \text{ where } F_i(p, q) = \bigcap_{l=p}^{q} F_i^{(l)} \; q \text{ and } p \text{ are integers,}$$

Where $$F_i(p, q)$$

are parametric Fibonacci and parametric Lucas number, where, $$e_{i,j} \in \{0, 1\}, \; e_{i,j} \in \{-1, 0, 1\}, \; e_{i,j} \in \{0, 1, j, j+1\}, \; j = \sqrt{-1}$$

where n, m and p and q are integer parameters, and where $\bigcap$ be the multiplication or addition operation.

* * * * *